US012125965B2

(12) United States Patent
Cho et al.

(10) Patent No.: US 12,125,965 B2
(45) Date of Patent: Oct. 22, 2024

(54) SECONDARY BATTERY HAVING HIGH RATE CAPABILITY AND HIGH ENERGY DENSITY AND METHOD OF MANUFACTURING THE SAME

(71) Applicant: Samsung Electronics Co., Ltd., Suwon-si (KR)

(72) Inventors: Kyunghoon Cho, Yongin-si (KR); Hwiyeol Park, Ansan-si (KR); Jin S. Heo, Hwaseong-si (KR); Hojung Yang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 553 days.

(21) Appl. No.: 17/410,197

(22) Filed: Aug. 24, 2021

(65) Prior Publication Data
US 2021/0384545 A1 Dec. 9, 2021

Related U.S. Application Data

(63) Continuation of application No. 14/990,162, filed on Jan. 7, 2016, now abandoned.

(30) Foreign Application Priority Data

Jan. 8, 2015 (KR) .................. 10-2015-0002857
Jan. 15, 2015 (KR) .................. 10-2015-0007444

(51) Int. Cl.
*H01M 10/052* (2010.01)
*H01M 4/04* (2006.01)
(Continued)

(52) U.S. Cl.
CPC ..... *H01M 10/052* (2013.01); *H01M 10/0459* (2013.01); *H01M 10/0472* (2013.01);
(Continued)

(58) Field of Classification Search
None
See application file for complete search history.

(56) References Cited

U.S. PATENT DOCUMENTS 5,162,178 A * 11/1992 Ohsawa ................ H01M 4/364
429/213
6,495,283 B1 12/2002 Yoon et al.
(Continued)

FOREIGN PATENT DOCUMENTS

CN 101584065 A 11/2009
CN 102035015 A 4/2011
(Continued)

OTHER PUBLICATIONS

Zhang, et al 2010 Journal of the American Ceramic Society, vol. 93 No. 7 pp. 1856-1859—Loughborough University repository version.
(Continued)

*Primary Examiner* — Anca Eoff
(74) *Attorney, Agent, or Firm* — CANTOR COLBURN LLP

(57) ABSTRACT

A secondary battery includes a first electrode collector layer and a second electrode collector layer, which face each other, a plurality of first active material layers that electrically contact the first electrode collector layer and are substantially perpendicular to the first electrode collector layer, a plurality of second active material layers that electrically contact the second electrode collector layer and are substantially perpendicular to the second electrode collector layer, and a first conductor layer that electrically contacts the first electrode collector layer and is inserted into the plurality of first active material layers.

8 Claims, 33 Drawing Sheets

(51) Int. Cl.

| | | |
|---|---|---|
| *H01M 4/139* | (2010.01) | |
| *H01M 4/66* | (2006.01) | |
| *H01M 6/40* | (2006.01) | |
| *H01M 10/04* | (2006.01) | |
| *H01M 10/0562* | (2010.01) | |
| *H01M 10/0583* | (2010.01) | |

(52) U.S. Cl.
CPC ... *H01M 10/0562* (2013.01); *H01M 10/0583* (2013.01); *H01M 4/0421* (2013.01); *H01M 4/139* (2013.01); *H01M 4/661* (2013.01); *H01M 6/40* (2013.01); *H01M 2300/0071* (2013.01)

(56) References Cited

U.S. PATENT DOCUMENTS

| | | | |
|---|---|---|---|
| 7,553,584 | B2 | 6/2009 | Chiang et al. |
| 8,691,450 | B1 | 4/2014 | Srinivasan et al. |
| 8,920,522 | B2 | 12/2014 | Matsuda et al. |
| 9,142,837 | B2 | 9/2015 | Sanada |
| 2002/0076616 | A1* | 6/2002 | Lee ............... G02F 1/1533 429/300 |
| 2004/0241540 | A1 | 12/2004 | Tsutsumi et al. |
| 2005/0048361 | A1 | 3/2005 | Wang et al. |
| 2007/0172735 | A1 | 7/2007 | Hall et al. |
| 2009/0035664 | A1 | 2/2009 | Chiang et al. |
| 2009/0202903 | A1 | 8/2009 | Chiang et al. |
| 2010/0112443 | A1 | 5/2010 | Blomgren et al. |
| 2011/0070477 | A1 | 3/2011 | Fujiwara et al. |
| 2011/0070479 | A1 | 3/2011 | Matsuda et al. |
| 2011/0111283 | A1 | 5/2011 | Rust, III et al. |
| 2011/0171518 | A1 | 7/2011 | Dunn et al. |
| 2011/0287292 | A1 | 11/2011 | Suyama et al. |
| 2013/0071552 | A1 | 3/2013 | Teraki et al. |
| 2013/0136973 | A1 | 5/2013 | Shenoy |
| 2013/0149605 | A1 | 6/2013 | Kakehata et al. |
| 2013/0189602 | A1 | 7/2013 | Lahiri et al. |
| 2014/0186698 | A1 | 7/2014 | Cobb et al. |
| 2014/0272547 | A1 | 9/2014 | Ramasubramanian et al. |
| 2014/0308576 | A1 | 10/2014 | Gaben et al. |
| 2014/0329132 | A1 | 11/2014 | Lahiri et al. |
| 2016/0164064 | A1 | 6/2016 | Lahiri et al. |

FOREIGN PATENT DOCUMENTS

| | | | |
|---|---|---|---|
| CN | 103947015 | A | 7/2014 |
| CN | 104094451 | A | 10/2014 |
| EP | 0862191 | A1 * | 9/1998 |
| JP | 201170788 | A | 4/2011 |
| KR | 20000047439 | A | 7/2000 |
| KR | 100553826 | B1 | 2/2006 |
| KR | 1020110001845 | A | 1/2011 |
| KR | 1020130028687 | A | 3/2013 |
| KR | 1020130031191 | A | 3/2013 |
| KR | 1020130064019 | A | 6/2013 |
| KR | 101311076 | B1 | 9/2013 |
| KR | 1020140085323 | A | 7/2014 |
| KR | 1020140096332 | A | 8/2014 |
| WO | 2014151202 | A1 | 9/2014 |

OTHER PUBLICATIONS

Long et al., Chemical Reviews 2004 vol. 104 No. 10 pp. 4463-4492.
Munshi (Munshi. Ed. Handbook of Solid State Batteries 1999 p. 47).
Chinese Office Action for Application No. 201610012296.8 dated Oct. 15, 2020, citing the above reference(s).
Korean Office Action for Application No. 1020150002857 dated Nov. 27, 2020, citing the above reference(s).
Chinese Office Action for Application No. 201610012296.8 dated Apr. 3, 2020, citing the above reference(s).
Extended European Search Report for Application No. 18162031.1 dated Jun. 15, 2018, citing the above reference(s).
Extended European Search Report for application No. 16150627.4 mailed on May 19, 2016, citing the above reference(s).
B. Gun Park et al., "Structural and electrochemical performance of three-dimensional LiMn2O4 thin film," J Mater Sci, (2010), 45, pp. 3947-3953.
D. Ruzmetoy et al., "Electrolyte Stability Determines Scaling Limits for Solid-State 3D Li Ion Batteries," Nano Letters, (2012), 12, pp. 505-511.
J.W. Long et al., "Three-Dimensional Battery Architectures," Chemical Reviews, 2004, vol. 104, No. 10, pp. 4463-4492.
Ke Sun et al., "3D Printing of Interdigitaled Li-Ion Microbattery Architectures," Advanced Materials, (2013), 25, pp. 4539-4543.
M. Kotobukia et al., "Effect of sol composition on solid electrode/ solid electrolyte interface for all-solid-state lithium ion battery, " Electrochimica Acta, 56, (2011), pp. 1023-1029.
Chinese Office Action dated Dec. 1, 2023, issued in Chinese Patent Application No. 202111087175.7 (with translation) (20 pages).

* cited by examiner

SECONDARY BATTERY HAVING HIGH RATE CAPABILITY AND HIGH ENERGY DENSITY AND METHOD OF MANUFACTURING THE SAME

CROSS-REFERENCE TO RELATED APPLICATIONS

This application is a continuation of U.S. patent application Ser. No. 14/990,162, filed on Jan. 7, 2016, which claims priority to Korean Patent Application Nos. 10-2015-0002857, filed on Jan. 8, 2015, and 10-2015-0007444, filed on Jan. 15, 2015, and all the benefits accruing therefrom under 35 U.S.C. § 119, the contents of which in their entireties are herein incorporated by reference.

BACKGROUND

1. Field

Exemplary embodiments of the invention relate to secondary batteries and methods of manufacturing the same, and more particularly, to a secondary battery having a structure that increases both the energy density and rate capability, and a method of manufacturing the secondary battery.

2. Description of the Related Art

Unlike primary batteries that cannot be charged, secondary batteries can be repeatedly charged and discharged, and thus are widely used in advanced electronic devices, such as cellular phones, laptops, and camcorders.

In detail, demands for lithium batteries have increased since the lithium batteries have a higher voltage than that of nickel-cadmium batteries or nickel-hydrogen batteries, which are widely used for portable electronic devices, and also high energy density per unit weight. A lithium-based oxide is mainly used as a positive electrode active material of the lithium battery, and a carbon material is mainly used as a negative electrode active material of the lithium battery. The lithium battery is generally classified into a liquid electrolyte battery and a polymer solid electrolyte battery based on the electrolyte type. A battery that uses a liquid electrolyte is referred to as a lithium ion battery and a battery that uses a polymer solid electrolyte is referred to as a lithium polymer battery.

Studies have been conducted to increase the energy density and rate capability of lithium batteries. Also, the capacity of lithium batteries may be increased by increasing the energy density and a charging speed of thereof may be increased by increasing the rate capability.

SUMMARY

One or more exemplary embodiments include a secondary battery having high energy density and high rate capability.

According to an exemplary embodiment, a battery includes a first electrode collector layer and a second electrode collector layer, which face each other, a plurality of first active material layers that electrically contact the first electrode collector layer and are substantially perpendicular to the first electrode collector layer, a plurality of second active material layers that electrically contact the second electrode collector layer and are substantially perpendicular to the second electrode collector layer, an electrolyte layer disposed between the plurality of first active material layers and the plurality of second active material layers, between the plurality of first active material layers and the second electrode collector layer, and between the plurality of second active material layers and the first electrode collector layer, and a first conductor layer that electrically contacts the first electrode collector layer and is inserted into the plurality of first active material layers.

In an exemplary embodiment, the first electrode collector layer and the second electrode collector layer may have plate shapes and be parallel to each other.

In an exemplary embodiment, the first electrode collector layer and the second electrode collector layer may have curved plate shapes and may be parallel to each other.

In an exemplary embodiment, the plurality of first active material layers may contact a first surface of the first electrode collector layer, the plurality of second active material layers may contact a second surface of the second electrode collector layer, and the first electrode collector layer and the second electrode collector layer may be disposed such that the first surface and the second surface face each other.

In an exemplary embodiment, the plurality of first active material layers may be disposed substantially perpendicular to the first surface of the first electrode collector layer, and the plurality of second active material layers may be disposed substantially perpendicular to the second surface of the second electrode collector layer.

In an exemplary embodiment, the plurality of first active material layers and the plurality of second active material layers may have a plate shape and are alternately arranged in parallel to each other.

In an exemplary embodiment, the first conductor layer may have an extended plate shape that protrudes substantially perpendicular to the first surface of the first electrode collector layer.

In an exemplary embodiment, the first conductor layer may be inserted into at least one of the plurality of first active material layers, and two side surfaces of the first conductor layer may contact the at least one of the plurality of first active material layers.

In an exemplary embodiment, a first end of the first conductor layer may contact the first surface of the first electrode collector layer, and a second end of the first conductor layer may contact the electrolyte layer, wherein the second end may be opposite to the first end.

In an exemplary embodiment, a first end of the first conductor layer may contact the first surface of the first electrode collector layer, and a second end of the first conductor layer may contact at least one of the plurality of first active material layers, wherein the second end may be opposite to the first end.

In an exemplary embodiment, the electrolyte layer may include a solid electrolyte.

In an exemplary embodiment, the electrolyte may be wound between the plurality of first active material layers and the plurality of second active material layers, between the plurality of first active material layers and the second electrode collector layer, and between the plurality of second active material layers and the first electrode collector layer.

In an exemplary embodiment, the battery may further include a second conductor layer that electrically contacts the second electrode collector layer and is inserted into the plurality of second active material layers.

In an exemplary embodiment, the second conductor layer may have an extended plate shape protruding from the second electrode collector layer.

In an exemplary embodiment, the second conductor layer may be inserted into at least one of the plurality of second active material layers, and two side surfaces of the second conductor layer may contact the at least one of the plurality of second active material layers.

In an exemplary embodiment, a first end of the second conductor layer may contact the second electrode collector layer, and a second end of the second conductor layer may contact the electrolyte layer, wherein the second end may be opposite to the first end.

In an exemplary embodiment, a first end of the second conductor layer may contact the second electrode collector layer, and a second end of the second conductor layer may contact at least one of the plurality of second active material layers, wherein the second end may be opposite to the first end.

In an exemplary embodiment, the plurality of first active material layers may include a positive electrode active material including sintered polycrystalline ceramics for forming a positive electrode, and the first conductor layer includes at least one metal material from among palladium (Pd), gold (Au), platinum (Pt), and silver (Ag) or an alloy thereof.

According to another exemplary embodiment, a battery includes a first electrode collector layer having a plate shape, a plurality of first active material layers that electrically contact the first electrode collector layer and are substantially perpendicular to the first electrode collector layer, a conductor layer that electrically contacts the first electrode collector layer and is inserted into the plurality of first active material layers, a second active material layer that comprises a plurality of first portions alternately arranged in parallel to the plurality of first active material layers and a second portion that faces and is parallel to the first electrode collector layer and extends from the plurality of first portions, and an electrolyte layer that is disposed between the plurality of first active material layers and the plurality of first portions of the second active material layer, between the plurality of first active material layers and the second portion of the second active material layer, and between the plurality of first portions of the second active material layer and the first electrode collector layer.

In an exemplary embodiment, the plurality of first portions of the second active material layer and the second portion may be unitary.

In an exemplary embodiment, the conductor layer may be inserted into at least one of the plurality of first active material layers, and two side surfaces of the conductor layer may contact the at least one of the plurality of first active material layers.

In an exemplary embodiment, a first end of the conductor layer may contact the first electrode collector layer and a second end of the conductor layer contacts the electrolyte layer, wherein the second end may be opposite to the first end.

In an exemplary embodiment, a first end of the conductor layer may contact the first electrode collector layer and a second end of the conductor layer contacts at least one of the plurality of first active material layers, wherein the second end may be opposite to the first end.

In an exemplary embodiment, the electrolyte layer may be wound between the plurality of first active material layers and the plurality of first portions of the second active material layer, between the plurality of first active material layers and the second portion of the second active material layer, and between the plurality of first portions of the second active material layer and the first electrode collector layer.

According to another exemplary embodiment, a battery includes a first electrode collector layer and a second electrode collector layer that face each other, a plurality of first active material layers electrically contacting the first electrode collector layer and perpendicular to the first electrode collector layer, an electrolyte layer provided in a zigzag shape along surfaces of the plurality of first active material layers and a surface of the first electrode collector layer, and including a first surface contacting the plurality of first active material layers and the first electrode collector layer and a second surface at a side opposite to the first surface, a second active material layer electrically contacting the second electrode collector layer and disposed along the second surface of the electrolyte layer, and a conductive layer electrically contacting the first electrode collector layer and inserted in the plurality of first active material layers.

In an exemplary embodiment, the second active material layer may completely fill a valley defined by the second surface of the electrolyte layer that is provided in a zigzag shape.

In an exemplary embodiment, the second active material layer may be provided in a zigzag shape along the second surface of the electrolyte layer provided in a zigzag shape.

In an exemplary embodiment, an empty space in which the second active material layer is not completely filled may be defined between the plurality of first active material layers.

According to another exemplary embodiment, a method of manufacturing a battery, the method includes preparing a sheet stack structure in which at least one first active material sheet assembly and at least one sacrificial layer sheet are alternately stacked, forming a stack structure in which at least one first active material assembly and at least one sacrificial layer are alternately stacked using the sheet stack structure, forming a first electrode collector layer on one surface of the stack structure, forming a first electrode structure by removing the at least one sacrificial layer, and sequentially forming an electrolyte layer, a second active material layer, and a second electrode collector layer on the first electrode structure, wherein the at least one first active material assembly and the sacrificial layer are perpendicular to the first electrode collector layer.

In an exemplary embodiment, the first active material sheet assembly may include a first active material sheet.

In an exemplary embodiment, the first active material sheet may be provided by manufacturing a slurry including an active material in a form of a sheet, and the sacrificial layer sheet may be provided by manufacturing a slurry including a sacrificial layer material in a form of a sheet.

In an exemplary embodiment, the method may further include forming a base sheet that includes a same material as that of the first active material sheet between one surface of the stack structure and the first electrode collector layer.

In an exemplary embodiment, the at least one first active material sheet assembly may include a conductor sheet and the first active material sheet disposed on at least one surface of the conductor sheet, wherein the conductor sheet may be provided by coating a paste including a collector material on the first active material sheet.

In an exemplary embodiment, the forming the stack structure and the first electrode collector layer may include cutting the sheet stack structure, forming a first electrode collector sheet by coating a paste including a collector material on one surface of the cut sheet stack structure, and forming the stack structure and the first electrode collector layer by sintering the cut sheet stack structure and the first electrode collector sheet.

In an exemplary embodiment, the forming the stack structure and the first electrode collector layer may include cutting the sheet stack structure, forming the stack structure by sintering the cut sheet stack structure, forming a first electrode collector sheet by coating a paste comprising a collector material on one surface of the stack structure, and forming the first electrode collector layer by heat-treating the first electrode collector sheet.

In an exemplary embodiment, the forming the stack structure and the first electrode collector layer may include sintering the sheet stack structure, forming the stack structure by cutting the sintered sheet stack structure, forming a first electrode collector sheet by coating a paste including a collector material on one surface of the stack structure, and forming the first electrode collector layer by heat-treating the first electrode collector sheet.

In an exemplary embodiment, the sacrificial layer may be removed using an etchant that selectively etches only the sacrificial layer.

According to another exemplary embodiment, a battery includes a first electrode collector layer and a second electrode collector layer that face each other, a plurality of first active material layers electrically contacting the first electrode collector layer and perpendicular to the first electrode collector layer, an electrolyte layer provided in a zigzag shape along surfaces of the plurality of first active material layers and a surface of the first electrode collector layer, and including a first surface contacting the plurality of first active material layers and the first electrode collector layer and a second surface at a side opposite to the first surface, and a second active material layer electrically contacting the second electrode collector layer and disposed along the second surface of the electrolyte layer, where an empty space in which the second active material layer is not completely filled may be defined between the plurality of first active material layer, and where the second active material layer is provided in a zigzag shape along the second surface of the electrolyte layer in a zigzag shape.

The battery may further include a base layer parallel to the first electrode collector layer between the first electrode collector layer and the first active material layer and between the first electrode collector layer and the electrolyte layer, and including a same material as that of the first active material layer.

BRIEF DESCRIPTION OF THE DRAWINGS

These and/or other exemplary embodiments will become apparent and more readily appreciated from the following description of the exemplary embodiments, taken in conjunction with the accompanying drawings in which.

DETAILED DESCRIPTION

Figure 1:
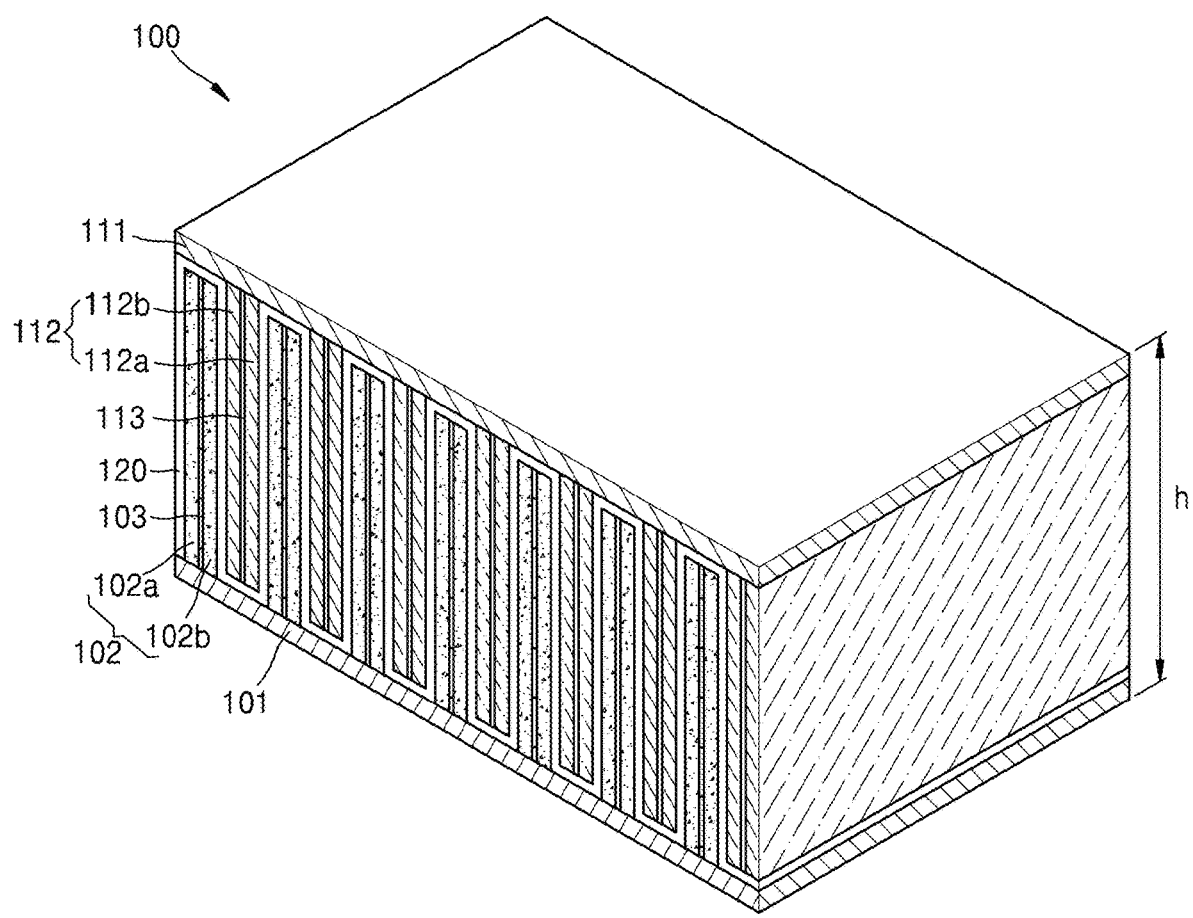
FIG. 1 is a perspective view of an exemplary embodiment of a structure of a unit cell of a secondary battery.

Hereinafter, a secondary battery having high energy density and high rate capability, and a method of manufacturing the secondary battery will be described in detail with reference to accompanying drawings, wherein like reference numerals refer to like elements throughout, and a size of an element may be exaggerated for clarity. In this regard, one or more exemplary embodiments described herein may have different forms and should not be construed as being limited to the descriptions set forth herein. When a layer is disposed "on" another layer in a layer structure described herein, the layer may be directly on the other layer while contacting the other layer or may be above the other layer while not contacting the other layer.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
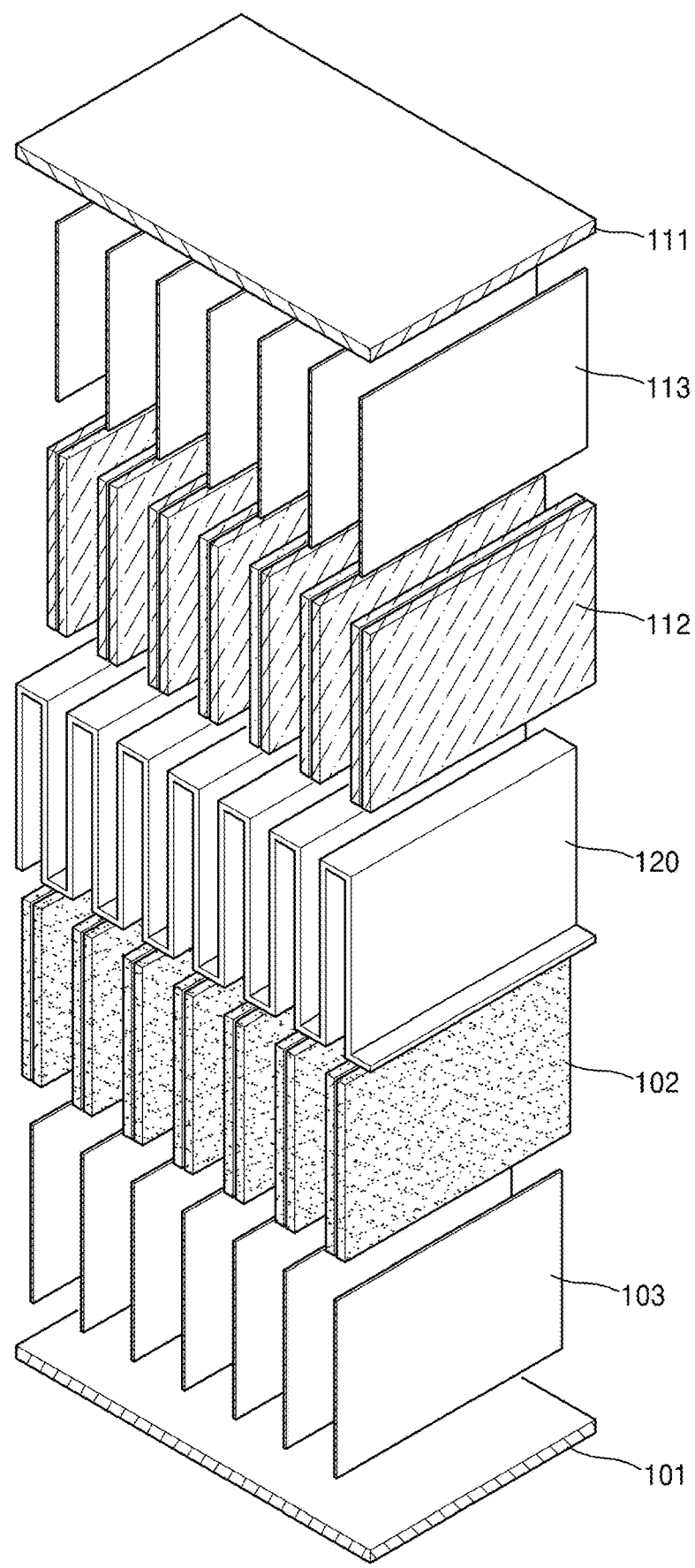
FIG. 2 is an exploded perspective view of the structure of the unit cell of the secondary battery of FIG. 1.

FIG. 1 is a perspective view of a structure of a unit cell of a secondary battery 100, according to an exemplary embodiment, and FIG. 2 is an exploded perspective view of the structure of the unit cell of the secondary battery 100 of FIG. 1. Referring to FIGS. 1 and 2, the secondary battery 100 according to the exemplary embodiment may include a first electrode collector layer 101 and a second electrode collector layer 111, which face each other, a plurality of first active material layers 102 that electrically contact the first electrode collector layer 101, a plurality of second active material layers 112 that electrically contact the second electrode collector layer 111, and an electrolyte layer 120 disposed between the plurality of first active material layers 102 and the plurality of second active material layers 112, between the plurality of first active material layers 102 and the second electrode collector layer 111, and between the plurality of second active material layers 112 and the first electrode collector layer 101. Also, the secondary battery 100 may further include a first conductor layer 103 that electrically contacts the first electrode collector layer 101 and is inserted into the plurality of first active material layers 102, and a second conductor layer 113 that electrically contacts the second electrode collector layer 111 and is inserted into the plurality of second active material layers 112.

In an exemplary embodiment, the first and second electrode collector layers 101 and 111 may include a conductive metal material, such as copper (Cu), gold (Au), platinum (Pt), silver (Ag), zinc (Zn), aluminum (Al), magnesium (Mg), titanium (Ti), iron (Fe), cobalt (Co), nickel (Ni), germanium (Ge), indium (In), or palladium (Pd). As shown in FIGS. 1 and 2, the first and second electrode collector layers 101 and 111 may have a flat plate shape and may be disposed parallel to each other.

The first active material layer 102 may electrically contact a surface of the first electrode collector layer 101, and the second active material layer 112 may electrically contact a surface of the second electrode collector layer 111. In an exemplary embodiment, the first and second active material layers 102 and 112 may be respectively adhered on surfaces of the first and second electrode collector layers 101 and 111, which face each other, for example. Here, the first active material layer 102 may include a combination of a positive electrode active material, a conductive agent, and a binder, and the first electrode collector layer 101 may be a positive electrode current collector. In an alternative exemplary embodiment, the first active material layer 102 may only include a positive electrode active material without a conductive agent or a binder. In an exemplary embodiment, the first active material layer 102 may include sintered polycrystalline ceramics or single crystal for forming a positive electrode, such as $LiCoO_2$. The second active material layer 112 may include a combination of a negative electrode active material, a conductive agent, and a binder, and the second electrode collector layer 111 may be a negative electrode current collector. In an alternative exemplary embodiment, the second active material layer 112 may only include a negative electrode active material without a conducting agent or a binder. In an exemplary embodiment, the second active material layer 112 may include a negative electrode metal, such as a Li metal.

Also, the first and second conductor layers 103 and 113 may include the same conductive metal material as that of the first and second electrode collector layers 101 and 111. However, according to a method of manufacturing the secondary battery 100, a material of the first conductive layer 103 disposed in the first active material layer 102 may be limited. In an exemplary embodiment, when the first active material layer 102 and the first conductive layer 103 are provided by inserting a metal paste between positive electrode active material sheets and sintering the metal paste and the positive electrode active material sheets together, a metal material that maintains stability during the sintering and does not affect the first active material layer 102 may be used as a material of the first conductive layer 103, for example. In an exemplary embodiment, in this case, the first conductive layer 103 may include a metal material such as palladium (Pd), gold (Au), platinum (Pt), or silver (Ag), or an alloy thereof.

As shown in FIGS. 1 and 2, the plurality of first active material layers 102 and the plurality of second active material layers 112 may be disposed substantially perpendicular to the first and second electrode collector layers 101 and 111. In an exemplary embodiment, the first active material layer 102 may protrude substantially perpendicular to a surface of the first electrode collector layer 101, and the second active material layer 112 may protrude substantially perpendicular to a surface of the second electrode collector layer 111, for example. However, the first and second active material layers 102 and 112 may not be completely perpendicular to the first and second electrode collector layers 101 and 111, and may be tilted. The plurality of first active material layers 102 and the plurality of second active material layers 112 may have a flat plate shape, and may be alternately disposed. In other words, the plurality of first active material layers 102 and the plurality of second active material layers 112 may be disposed perpendicular to the first and second electrode collector layers 101 and 111 between the first and second electrode collector layers 101 and 111, and may be alternately arranged along a direction parallel to the surfaces of the first and second electrode collector layers 101 and 111.

The electrolyte layer 120 may be disposed such that the plurality of first active material layers 102 does not directly contact the plurality of second active material layers 112 and the second electrode collector layer 111. Also, the electrolyte layer 120 may be disposed such that the second active material layers 112 do not directly contact the plurality of first active material layers 102 and the first electrode collector layer 101. Accordingly, the electrolyte layer 120 may be windingly provided between the plurality of first active material layers 102 and the plurality of second active material layers 112, between the plurality of first active material layers 102 and the second electrode collector layer 111, and between the plurality of second active material layers 112 and the first electrode collector layer 101. Accordingly, the first and second active material layers 102 and 112 may exchange metal ions through the electrolyte layer 120 without directly contacting each other. Also, the first electrode collector layer 101 is not electrically connected to the second active material layer 112, and the second electrode collector layer 111 is not electrically connected to the first active material layer 102. According to the exemplary embodiment, the electrolyte layer 120 may include a solid electrolyte that has a fixed winding shape. In an exemplary embodiment, the electrolyte layer 120 may include a solid electrolyte, such as $Li_3PO_4$, $Li_3PO_{4-x}N_x$, $LiBO_{2-x}N_x$, $Li_3PO_4N_x$, $LiBO_2N_x$, $Li_4SiO_4$-$Li_3PO_4$, $Li_4SiO_4$-$Li_3VO_4$.

Since electric conductivity of the first and second active material layers 102 and 112 are generally lower than electric conductivity of the first and second electrode collector layers 101 and 111, the first and second conductor layers 103 and 113 may be respectively inserted into the first and second active material layers 102 and 112 for uniform ion exchange reactions between the first and second active material layers 102 and 112. In an exemplary embodiment, the first conductor layer 103 may be electrically connected to the first electrode collector layer 101 and inserted into the first active material layer 102, for example. Also, the second conductor layer 113 may be electrically connected to the second electrode collector layer 111 and inserted into the second active material layer 112.

The first conductor layer 103 and the first electrode collector layer 101 may be combined to each other after being separately manufactured using different materials, but in an alternative exemplary embodiment, may be unitary using the same conductive material. Similarly, the second conductor layer 113 and the second electrode collector layer 101 may be combined to each other after being separately manufactured using different materials, but in an alternative exemplary embodiment, may be unitary using the same conductive material. In an exemplary embodiment, the first electrode collector layer 101 may be provided to have the first conductor layer 103 having a plurality of extending plate shapes protruding perpendicular to the surface of the first electrode collector layer 101, and the second electrode collector layer 111 may be provided to have the second conductor layer 113 having a plurality of extending plate shapes protruding perpendicular to the surface of the second electrode collector layer 111, for example. In FIGS. 1 and 2, the first and second conductor layers 103 and 113 have a flat plate shape, but may not be completely flat. In an exemplary embodiment, the first and second conductor layers 103 and 113 may have any one of various shapes, such as a fishbone shape, a mesh shape, or a matrix shape.

Since the first conductor layer 103 having a flat plate shape is inserted into each of the first active material layers 102, two side surfaces of the first conductor layer 103 may contact the first active material layer 102. Similarly, since the second conductor layer 113 is inserted into each of the second active material layers 112, two side surfaces of the second conductor layer 113 may contact the second active material layer 112. The first and second conductor layers 103 and 113 may respectively extend from the first and second electrode collector layers 101 and 111 to contact the electrolyte layer 120. In other words, first ends of the first and second conductor layers 103 and 113 may respectively contact the first and second electrode collector layers 101 and 111, and second ends of the first and second conductor layers 103 and 113 may contact the electrolyte layer 120. As such, the first and second conductor layers 103 and 113 may respectively completely divide the first and second active material layers 102 and 112. In an exemplary embodiment, the first active material layer 102 may be divided into two portions 102a and 102b by the first conductor layer 103, and the second active material layer 112 may be divided into two portions 112a and 112b by the second conductor layer 113, for example.

Since the first and second conductor layers 103 and 113 are respectively inserted into the first and second active material layers 102 and 112, electrons may be easily transmitted from ends of the first and second active material layers 102 and 112 adjacent to the electrolyte layer 120 respectively to the first and second electrode collector layers 101 and 111. In an exemplary embodiment, when the first conductor layer 103 is not used, the end region of the first active material layer 102 adjacent to the electrolyte layer 102 is far from the first electrode collector layer 101 compared to other regions of the first active material layer 102, and thus it may be difficult to transmit electrons from the end of the first active material layer 102 to the first electrode collector layer 101, for example. When a length of the first active material layer 102 is increased in this regard, the end region of the first active material layer 102 may not be utilized. However, using the first and second conductor layers 103 and 113, electrons may be easily transmitted from the first and second electrode collector layers 101 and 111 to the ends of the first and second active material layers 102 and 112 adjacent to the electrolyte layer 120. Accordingly, metal ions are uniformly exchanged through the electrolyte layer 120 between the first and second active material layers 102 and 112 in the entire region of the first and second active material layers 102 and 112, and thus lengths of the first and second active material layers 102 and 112 may be sufficiently long.

In FIGS. 1 and 2, the first and second conductor layers 103 and 113 are respectively inserted into all of the first and second active material layers 102 and 112, but an exemplary embodiment is not limited thereto. In other words, the first and second conductor layers 103 and 113 may be selectively inserted into some of the first and second active material layers 102 and 112. In an exemplary embodiment, the first and second conductor layers 103 and 113 may be respectively inserted into every other first and second active material layers 102 and 112, for example.

Figure 3:
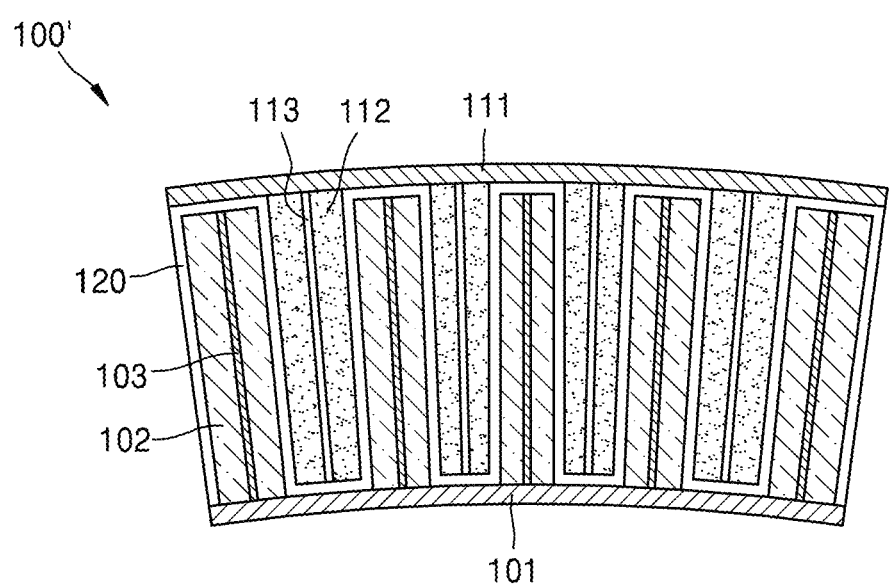
FIG. 3 is a cross-sectional view of another exemplary embodiment of a structure of a unit cell of a secondary battery.

Also, in FIGS. 1 and 2, the first and second electrode collector layers 101 and 111 have a complete plate shape, and the secondary battery 100 has a complete rectangular shape, but an exemplary embodiment is not limited thereto. In an exemplary embodiment, FIG. 3 is a cross-sectional view of a structure of a unit cell of a secondary battery 100', according to another exemplary embodiment, for example. As shown in FIG. 3, the secondary battery 100' may be a bent rectangular shape. In this case, the first and second electrode collector layers 101 and 111 may have a curved plate shape having a curvature while being parallel to each other. The secondary battery 100' having such a bent rectangular shape may be applied to any one of various electronic devices manufacture to have a curved shape.

According to the exemplary embodiment described above, both of energy density and rate capability of the secondary battery 100 may be improved since the first and second active material layers 102 and 112 that are parallel to each other and are independent are alternately arranged perpendicular to the surfaces of the first and second electrode collector layers 101 and 111 between the first and second electrode collector layers 101 and 111 that are parallel to each other. In an exemplary embodiment, when a height h of a unit cell of the secondary battery 100 is increased by increasing heights of the first and second active material layers 102 and 112, a reaction surface area increases in proportion to the height of the unit cell, and thus rate capability is increased, for example. Also, when the height of the unit cell is increased, fractions of the first and second active material layers 102 and 112 occupying the secondary battery 100 are increased, and thus energy density of the secondary battery 100 may also be increased. Accordingly, duration of using the secondary battery 100 is increased while increasing a charging speed. Also, since a solid electrolyte is used, the secondary battery 100 according to the exemplary embodiment may have high battery stability. Since the unit cell of such a secondary battery 100 may have a small size, the secondary battery 100 may be used for a small device, such as a mobile device or a wearable device.

Figure 4:
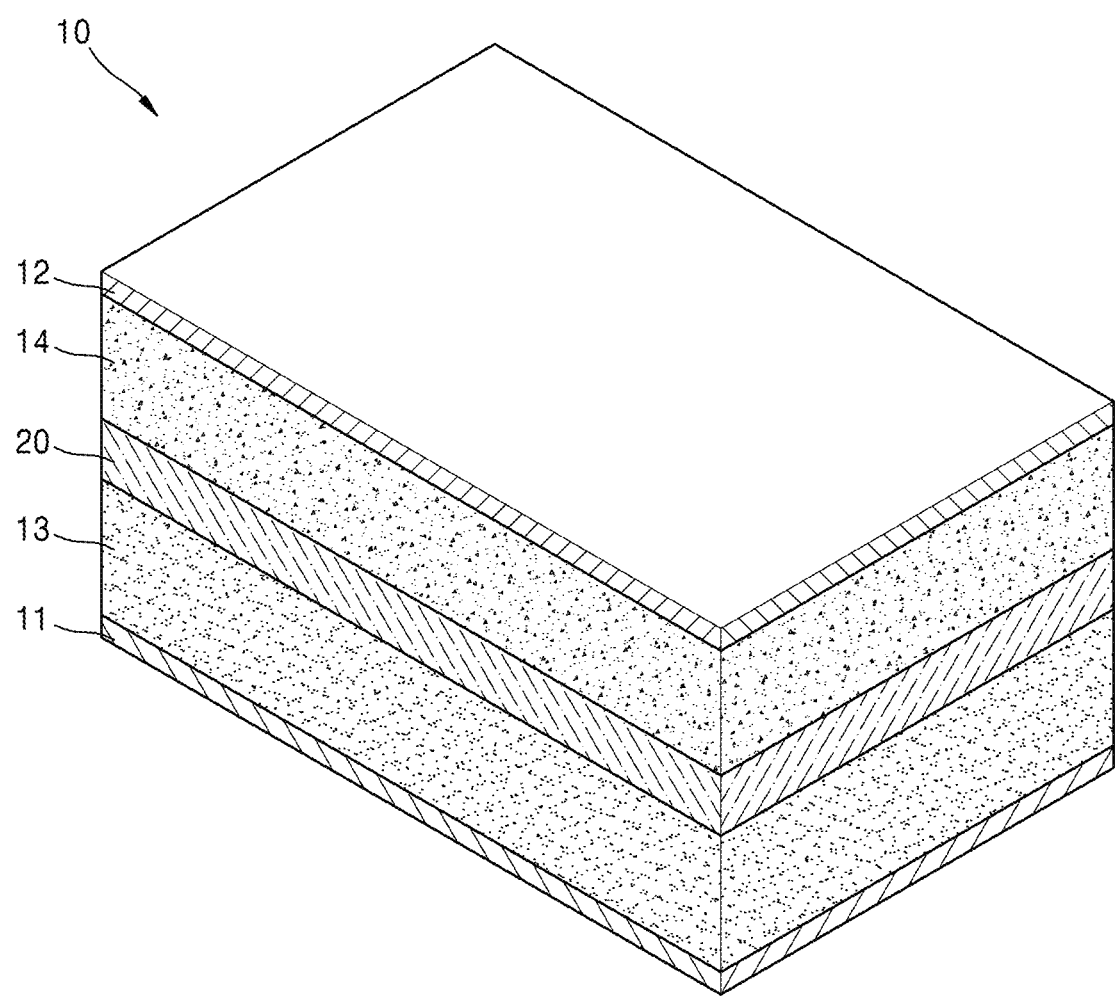
FIG. 4 is a perspective view of a structure of a unit cell of a secondary battery according to a comparative example.
Figure 5:
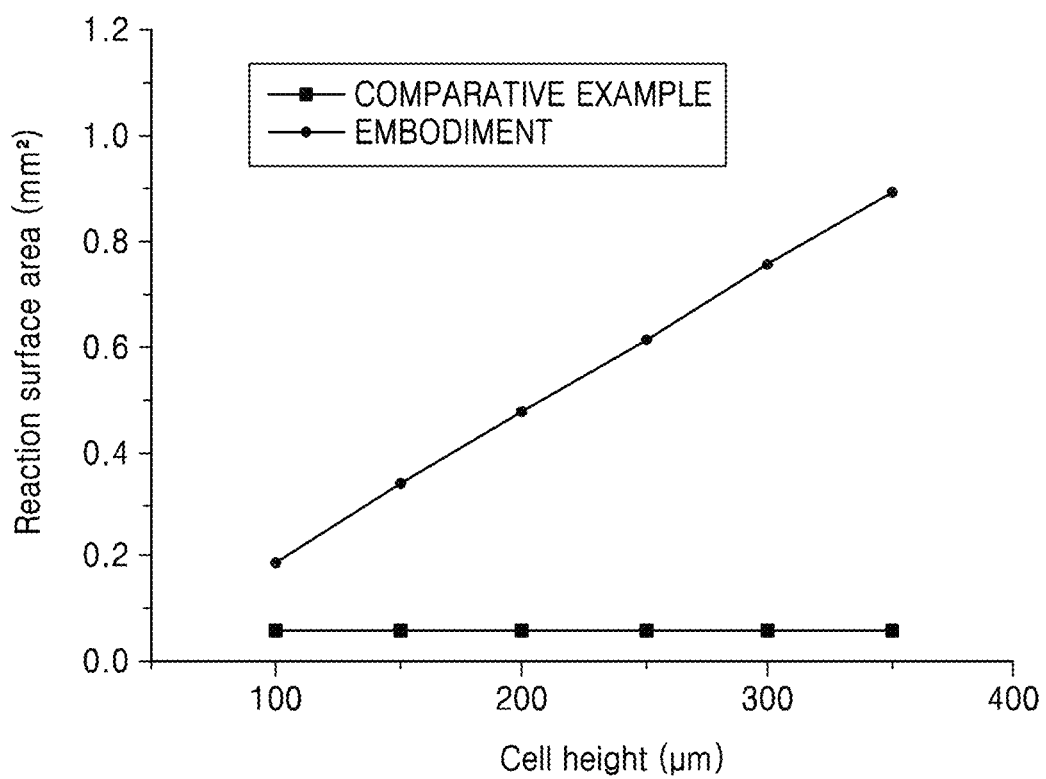
FIG. 5 is a graph for comparing the unit cell of FIG. 1 and the unit cell of FIG. 4 with respect to a relationship between a height of a unit cell and a reaction surface area.
Figure 6:
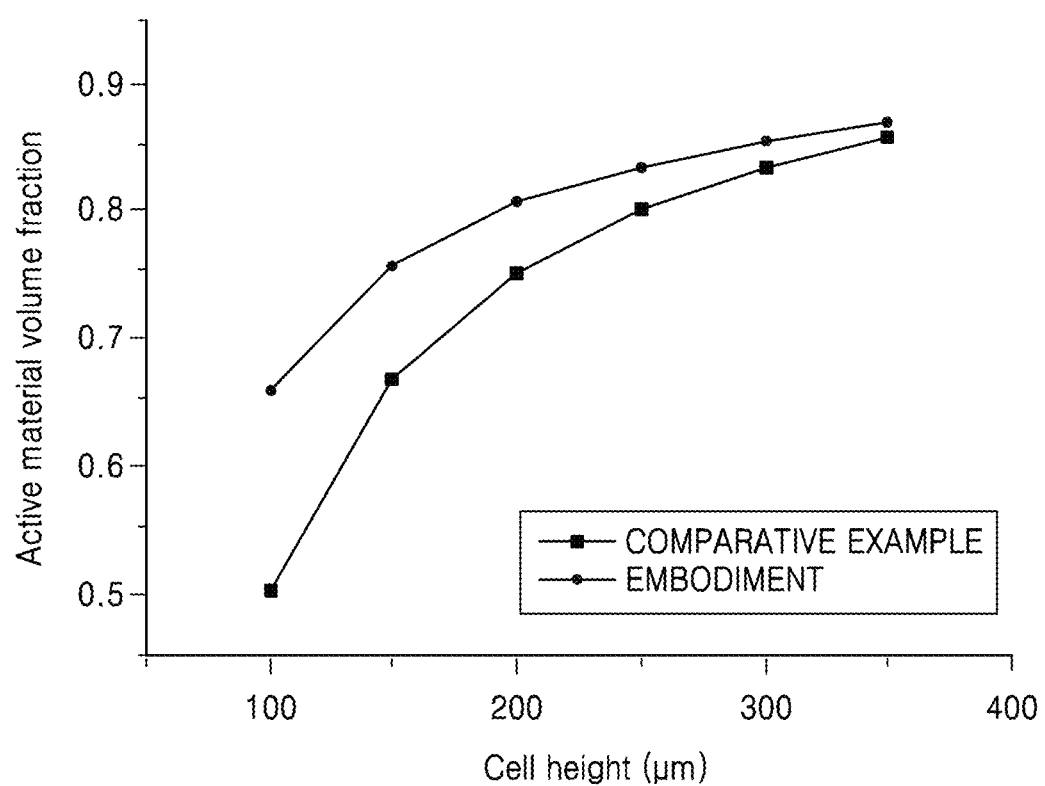
FIG. 6 is a graph for comparing the unit cell of FIG. 1 and the unit cell of FIG. 4 with respect to a relationship between a height of a unit cell and a fraction of an active material.

FIG. 4 is a perspective view of a structure of a unit cell of a secondary battery 10 according to a comparative example, and FIGS. 5 and 6 are graphs for comparing characteristics of the secondary battery 100 and the secondary battery 10. In detail, FIG. 5 is a graph for comparing the secondary battery 100 of FIG. 1 and the secondary battery 10 of FIG. 4 with respect to a relationship between a height of a unit cell and a reaction surface area, and FIG. 6 is a graph for comparing the secondary battery 100 of FIG. 1 and the secondary battery 10 of FIG. 4 with respect to a relationship between a height of a unit cell and a fraction of an active material.

First, referring to FIG. 4, the secondary battery 10 according to the comparative example, includes a first electrode collector layer 11, a first active material layer 13, a separator 20, a second active material layer 14, and a second electrode collector layer 12, which are sequentially stacked in the stated order. As shown in FIG. 4, the first electrode collector layer 11, the first active material layer 13, separator 20, the second active material layer 14, and the second electrode collector layer 12 are all parallel to each other. Also, it is assumed that the secondary battery 10 according to the comparative example uses a liquid electrolyte.

The graphs of FIGS. 5 and 6 are obtained by changing the heights of the unit cells of the secondary battery 100 and the secondary battery 10 while assuming that lengths and the widths of the unit cells are the same, i.e., respectively about 294 micrometers (μm) and about 20 μm. Also, it is assumed that in the secondary battery 100, thicknesses of the first and second active material layers 102 and 112 are about 20 μm and a thickness of the electrolyte layer 120 is about 1 μm, and in the secondary battery 10, thicknesses of the first and second active material layers 13 and 14 are about 50 μm and a thickness of the separator 20 is about 20 μm. Also, it is assumed that thicknesses of the first and second electrode collector layers 101 and 111, and 11 and 12 are about 15 μm in the secondary batteries 100 and 10. A size of the secondary battery 10 described above is based on a specification of a commercial battery.

As shown in FIG. 5, even when the height of the unit cell is increased, the reaction surface area of the secondary battery 10 is uniformly maintained. However, the reaction surface area of the secondary battery 100 may linearly increase in proportion to the height. Also, referring to FIG. 6, an active material volume fraction increases in both the secondary batteries 10 and 100 when the height of the unit cell increases, but in overall, the active material volume fraction of the secondary battery 100 is higher than that of the secondary battery 10. In an exemplary embodiment, when the height of the unit cell is about 150 μm, the reaction surface area of the secondary battery 10 is about 58,800 square micrometers ($\mu m^2$) and the active material volume fraction of the secondary battery 10 is about 0.67, whereas the reaction surface area of the secondary battery 100 is about 333,200 $\mu m^2$ and the active material volume fraction of the secondary battery 100 is about 0.76, for example. As such, the secondary battery 100 has the reaction surface area that is at least 5 times that of the secondary battery 10, and has the active material volume fraction that is higher than that of the secondary battery 10 by at least 13 percent (%).

Figure 7:
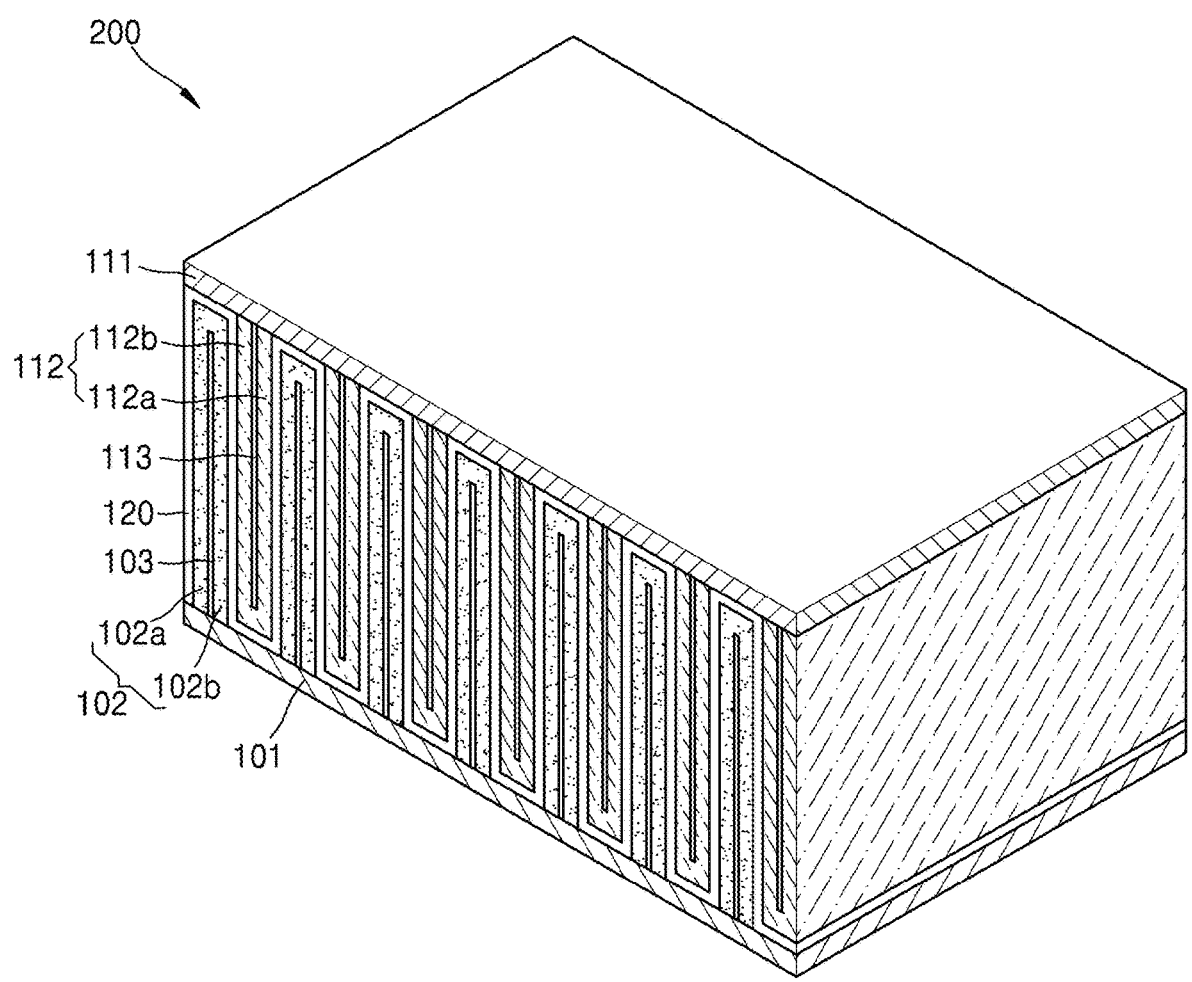
FIG. 7 is a perspective view of another exemplary embodiment of a structure of a unit cell of a secondary battery.

FIG. 7 is a perspective view of a structure of a unit cell of a secondary battery 200, according to another exemplary embodiment. In the secondary battery 100 of FIG. 1, the first and second conductor layers 103 and 113 contact the electrolyte layer 120 by extending respectively from the first and second electrode collector layers 101 and 11 to the electrolyte layer 120. Accordingly, the first and second conductor layers 103 and 113 may completely and respectively divide the first and second active material layers 102 and 112. However, as shown in FIG. 7, the first and second conductor layers 103 and 113 may extend close to the electrolyte layer 120, but may not contact the electrolyte layer 120. In this case, the two portions 102a and 102b of the first active material layer 102 respectively contacting the two side surfaces of the first conductor layer 103 may not be completely divided and may be connected to each other at a region adjacent to the electrolyte layer 120. Similarly, the two portions 112a and 112b of the second active material layer 112 respectively contacting the two side surfaces of the second conductor layer 113 may not be completely divided and may be connected to each other at a region adjacent to the electrolyte layer 120. In FIG. 7, the first and second conductor layers 103 and 113 do not contact the electrolyte layer 120, but in an alternative exemplary embodiment, any one of the first and second conductor layers 103 and 113 may contact the electrolyte layer 120 and the other one may not contact the electrolyte layer 120.

Figure 8:
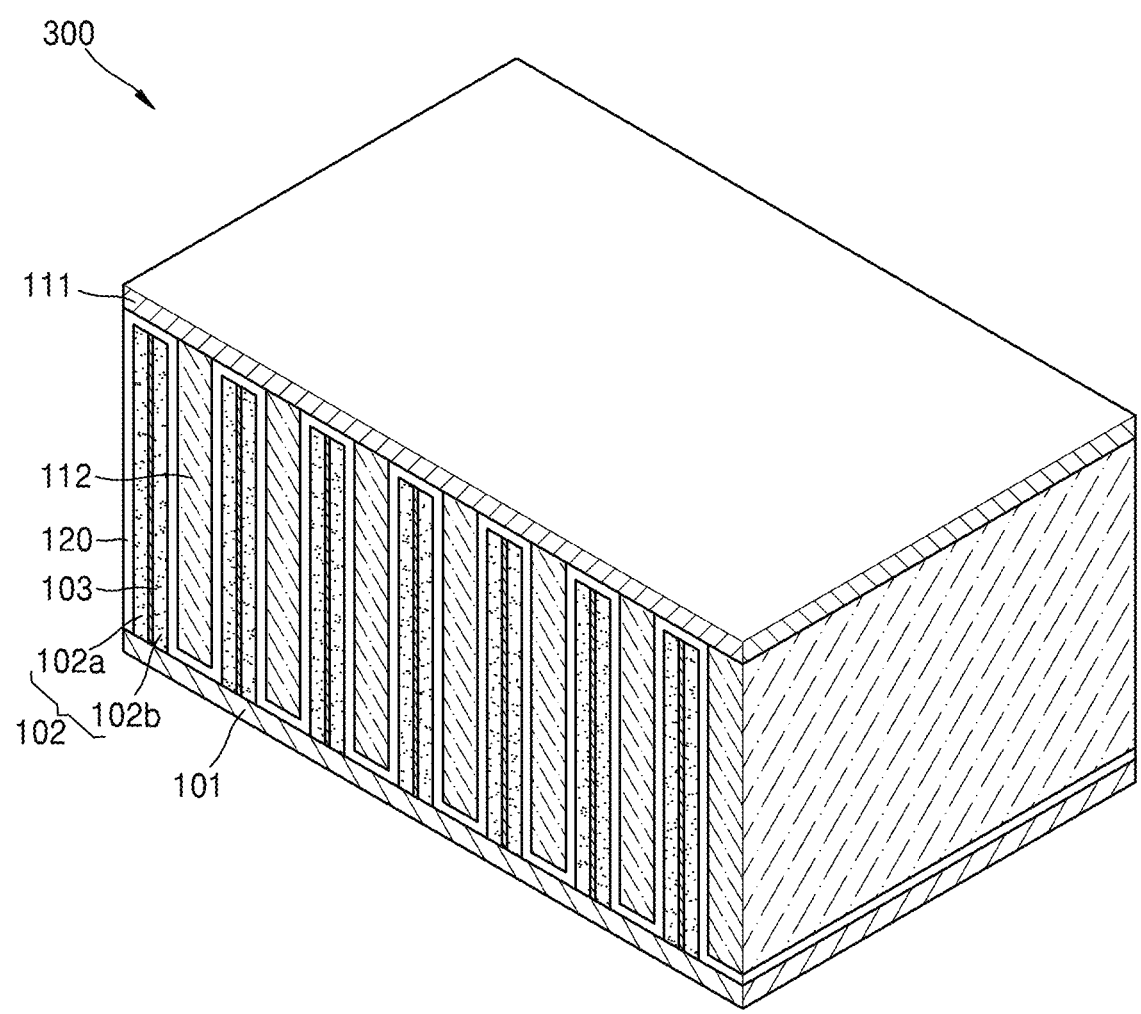
FIG. 8 is a perspective view of another exemplary embodiment of a structure of a unit cell of a secondary battery.

FIG. 8 is a perspective view of a structure of a unit cell of a secondary battery 300, according to another exemplary embodiment. Comparing the secondary battery 300 with the secondary battery 100 of FIG. 1, the secondary battery 300 of FIG. 8 does not include the second conductor layer 113. The other configuration of the secondary battery 300 may be the same as that of the secondary battery 100. When the second active material layer 112 includes an active material having sufficiently high electric conductivity, electrons may be smoothly transmitted from the end of the second active material layer 112, which is adjacent to the electrolyte layer 120, to the second electrode collector 111, and thus the second conductor layer 113 may be omitted. Although not shown in FIG. 8, when the first active material layer 102 includes an active material having sufficiently high electric conductivity, the first conductor layer 103 may be omitted. In FIG. 8, the first conductor layer 103 contacts the electrolyte layer 120, but according to another exemplary embodiment, the first conductor layer 103 may not contact the electrolyte layer 120.

Figure 9A:
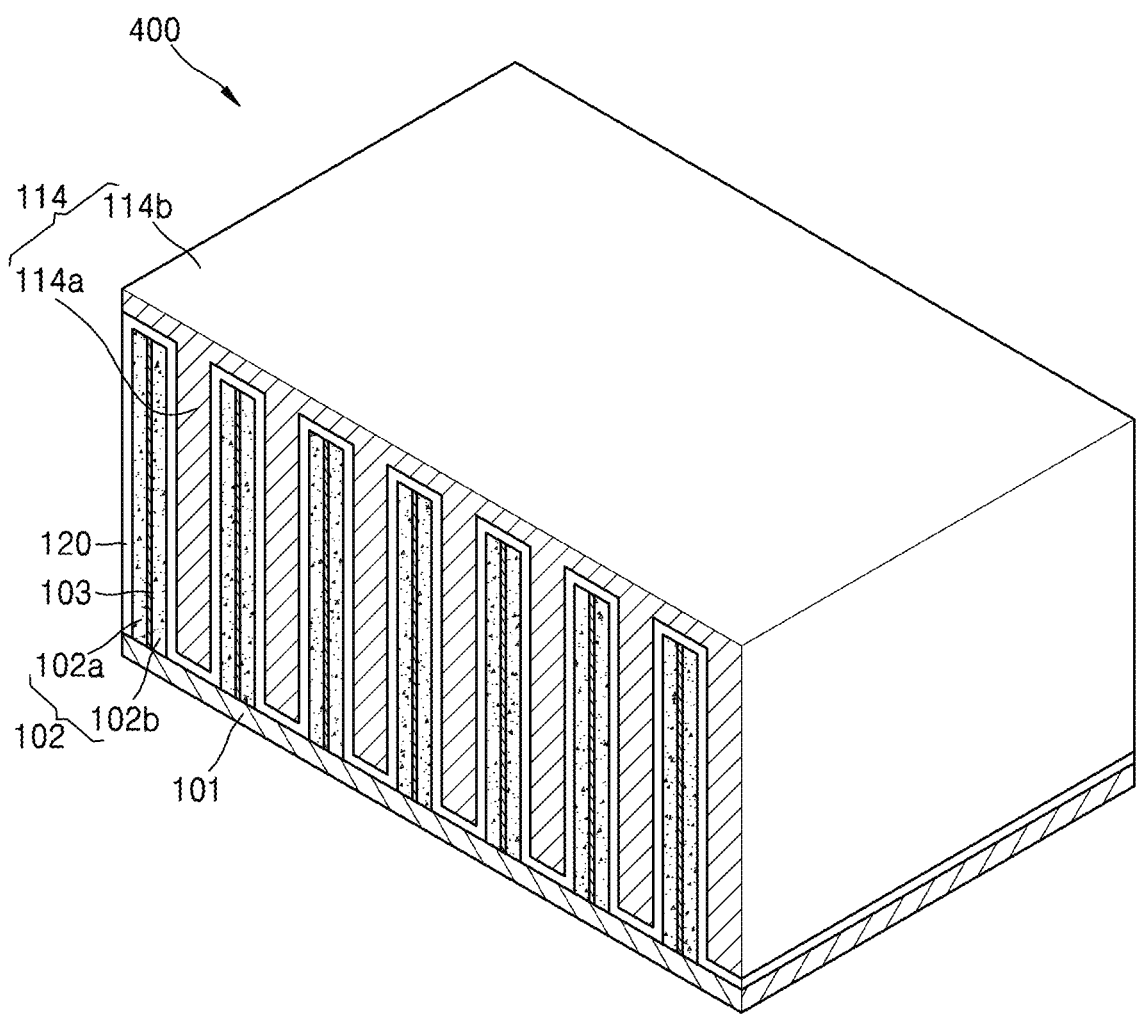
FIGS. 9A and 9B are respectively a perspective view and an exploded perspective view of another exemplary embodiment of a structure of a unit cell of a secondary battery.
Figure 9B:
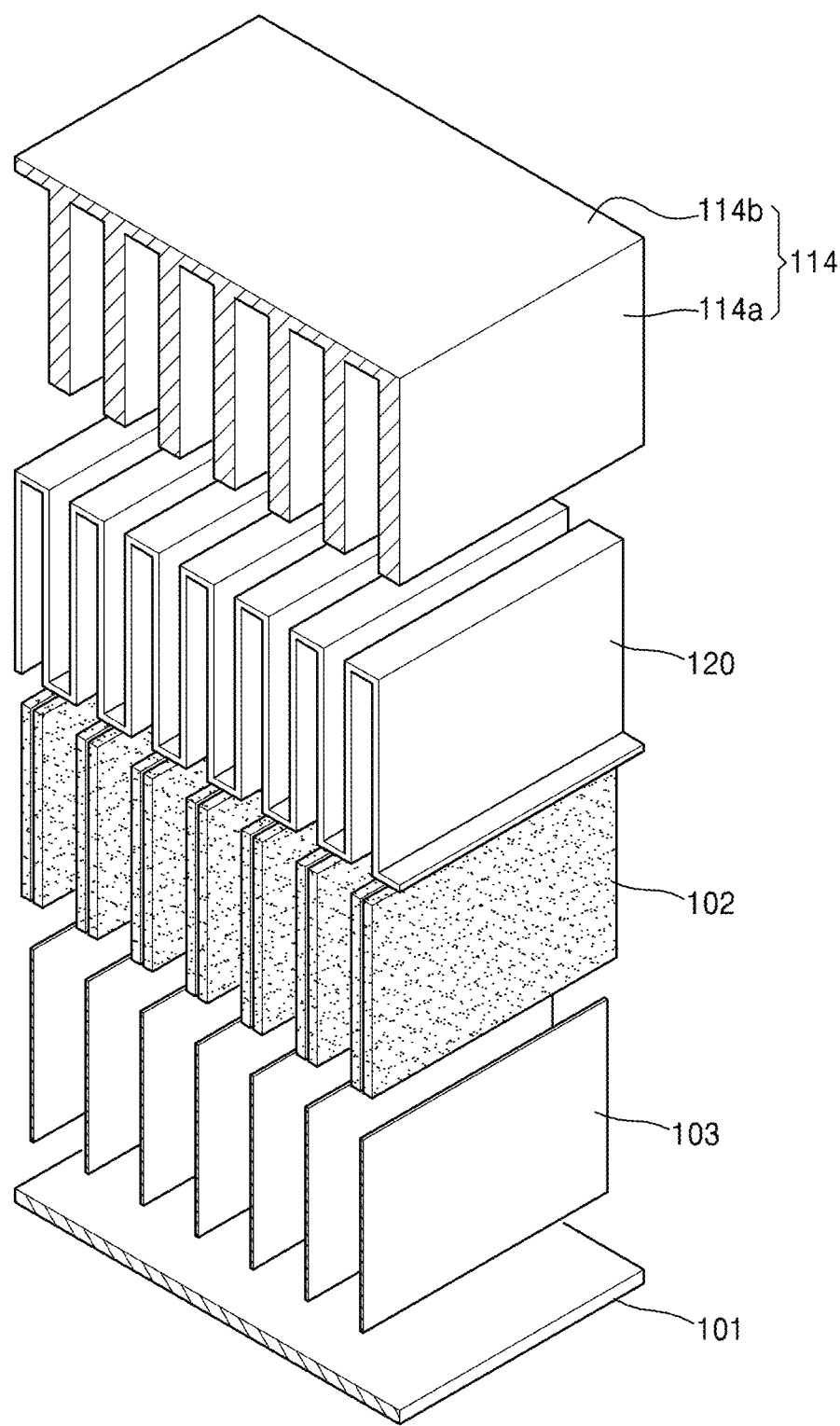

FIGS. 9A and 9B are respectively a perspective view and an exploded perspective view of a structure of a unit cell of a secondary battery 400, according to another exemplary embodiment. Comparing the secondary battery 400 with the secondary battery 100 of FIG. 1, the secondary battery 400 may not use a second electrode collector layer, and a second active material layer 114 may operate as a second electrode collector layer. The other configuration of the second battery 400 may be the same as that of the secondary battery 100.

When the second active material layer 114 includes an active material having excellent electric conductivity, such as a Li metal, the second active material layer 114 may operate as an electrode collector layer as shown in FIGS. 9A and 9B. Accordingly, the second active material layer 114 may include a plurality of first portions 114a that are arranged alternately and in parallel with the plurality of first active material layers 102, and a second portion 114b that is arranged facing and in parallel to the first electrode collector layer 101. The second portion 114b of the second active material layer 114 may operate as the second electrode collector layer 111 of FIG. 1 and have a plate shape. Also, the plurality of first portions 114a may be an extended plate shape perpendicularly protruding from the second portion 114b. The plurality of first portions 114a and the second portion 114b may be unitary and include the same material. The electrolyte layer 120 may be windingly disposed between the plurality of first active material layers 102 and the plurality of the first portions 114a of the second active material layer 114, between the plurality of first active material layers 102 and the second portion 114b of the second active material layer 114, and between the plurality of the first portions 114a of the second active material layer 114 and the first electrode collector layer 101.

Figure 10:
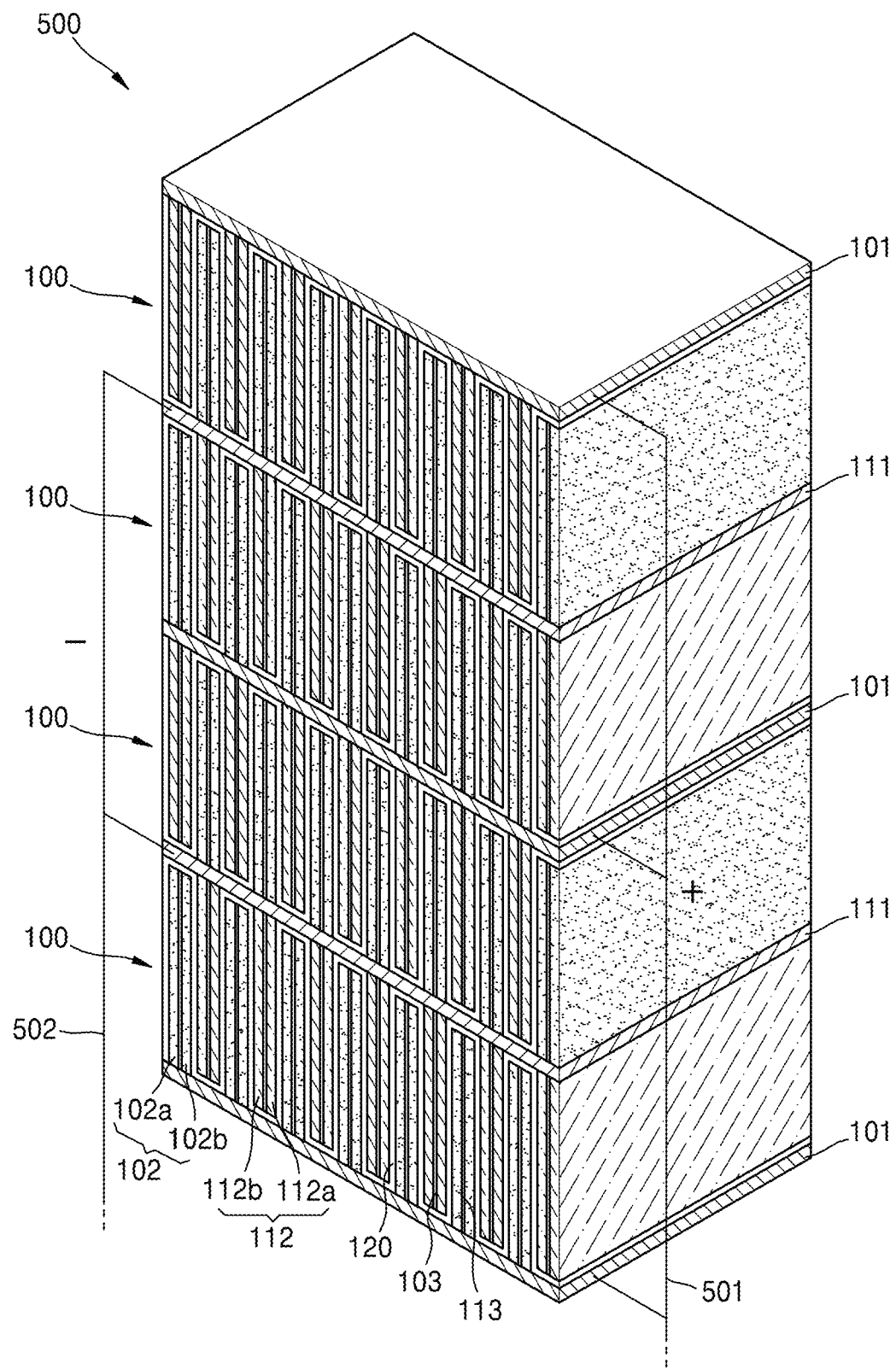
FIG. 10 is a perspective view of an exemplary embodiment of a stacked structure provided by stacking a plurality of the unit cells of FIG. 1.

FIG. 10 is a perspective view of a stacked structure 500 provided by stacking a plurality of the unit cells of the secondary battery 100 of FIG. 1, according to an exemplary embodiment. Referring to FIG. 10, when the unit cells of the secondary battery 100 are stacked, the unit cells may be arranged such that same types of the first and second electrode collector layers 101 and 111 contact each other. In an exemplary embodiment, the first electrode collector layer 101 of the unit cell of the secondary battery 100 may contact the first electrode collector layer 101 of the unit cell of the other secondary battery 100, and the second electrode collector layer 111 of the unit cell of the secondary battery 100 may contact the second electrode collector layer 111 of the unit cell of the other secondary battery 100, for example. Also, a first conducting wire 501 may be connected to the first electrode collector layers 101 and a second conducting wire 502 may be connected to the second electrode collector layers 111 such that the unit cells of the secondary batteries 100, which are stacked on each other, are electrically connected in parallel.

Figure 11:
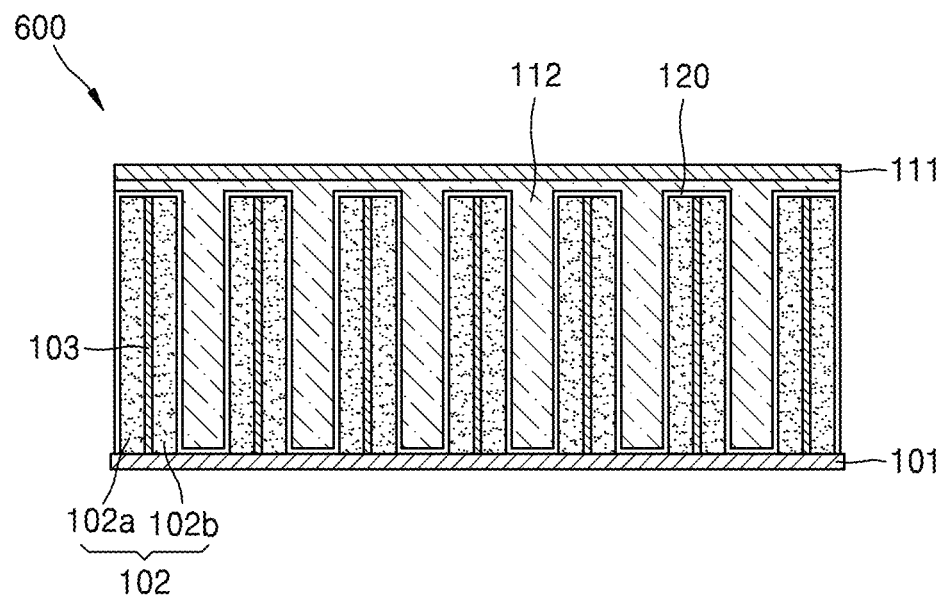
FIG. 11 is a cross-sectional view of an exemplary embodiment of a structure of a secondary battery.

FIG. 11 is a cross-sectional view of a structure of a secondary battery 600 according an exemplary embodiment.

The secondary battery 600 of FIG. 11 is different from the secondary battery 100 of FIG. 1 in that the electrolyte layer 120 does not directly contact the second electrode collector layer 111. In the secondary battery 100 of FIG. 1, since the second active material layers 112 are completely spaced apart from each other, the second electrode collector layer 111 is exposed between the second active material layers 112.

Accordingly, the electrolyte layer 120 contacts the second electrode collector layer 111 between the second active material layers 112 that are adjacent to each other. In contrast, in the secondary battery 600 of FIG. 11, end portions of the second active material layers 112 are connected to each other and extend along the surface of the second electrode collector layer 111 to cover the second electrode collector layer 111. Accordingly, the electrolyte layer 120 does not contact the second electrode collector layer 111 between the second active material layers 112 that are adjacent to each other. Instead, the electrolyte layer 120 contacts a surface provided as the end portions of the second active material layers 112 connected to each other along the surface of the second electrode collector layer 111.

In other words, in the exemplary embodiment of FIG. 11, the electrolyte layer 120 may be provided in a zigzag shape between the first active material layers 102 and the second active material layers 112 and between the second active material layers 112 and the first electrode collector layer 101. Accordingly, a first surface of the electrolyte layer 120 may be provided in a zigzag shape to contact the surfaces of the first active material layers 102 and the surface of the first electrode collector layer 101. The second active material layers 112 may be disposed to contact a second surface of the electrolyte layer 120 at the opposite side to the first electrode collector layer 101.

FIGS. 12 through 33 are diagrams for describing a method of manufacturing the secondary battery 600 of FIG. 11. Hereinafter, it is assumed that the first electrode collector layer 101 is a positive electrode collector, the first active material layer 102 is a positive electrode active material, the second electrode collector layer 111 is a negative electrode collector, and the second active material layer 112 is a negative electrode active material.

Figure 12:
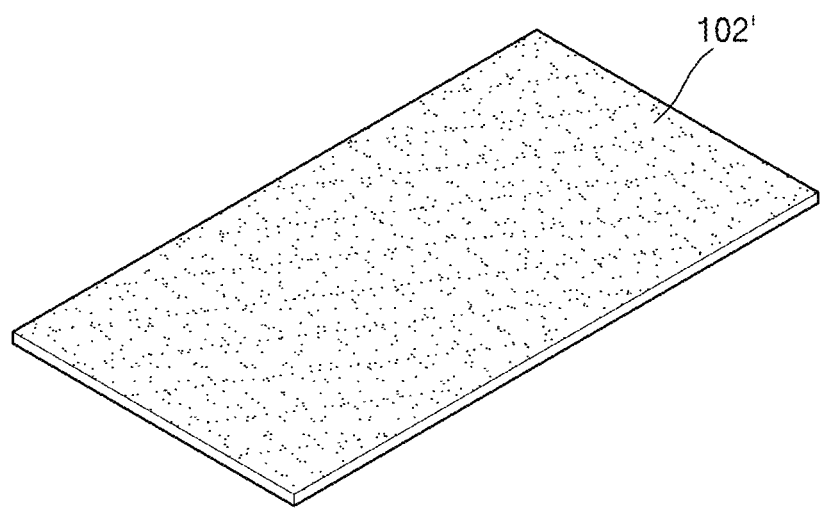
FIGS. 12 through 33 are diagrams for describing a method of manufacturing the secondary battery of FIG. 11.

Referring to FIG. 12, a first active material sheet 102' is prepared. In an exemplary embodiment, the first active material sheet 102' may have a thickness of about 1µ to about 30µ, for example, but the embodiments are not limited thereto. The first active material sheet 102' may be positive electrode sheets. In this case, the first active material sheet 102' may include a positive electrode material, such as a lithium cobalt oxide ("LCO"). However, embodiments are not limited thereto. The first active material sheet 102' may be provided by manufacturing a slurry 52 (refer to FIG. 13) including a positive electrode material, a dispersing agent, a solvent, a binder, and a plasticizer, for example, in the form of a sheet.

Figure 13:
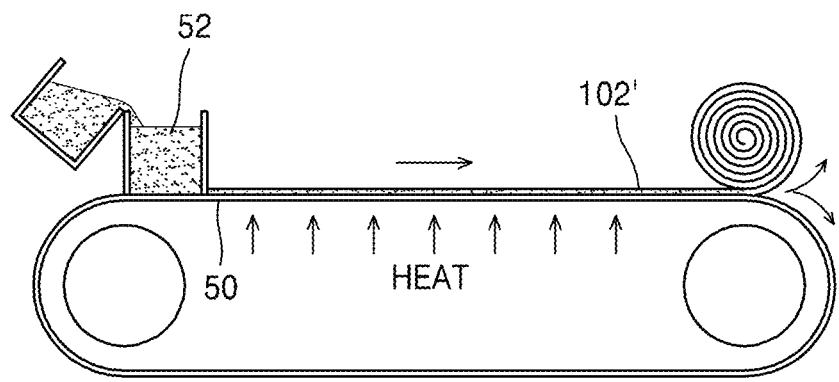

FIG. 13 is a view illustrating a process of forming the first active material sheet 102' using tape casting. Referring to FIG. 13, first, the slurry 52 including the positive electrode material, the dispersing agent, the solvent, the binder, and the plasticizer, for example, is prepared. Subsequently, the slurry 52 is applied onto a carrier film 50 on a moving belt. Here, the slurry 52 may be applied onto the carrier film 50 to have a uniform thickness using a doctor blade, for example. Next, the slurry 52 applied onto the carrier film 50 is dried so that the first active material sheet 102' may be manufactured.

Here, in order to effectively dry the slurry 52, the slurry 52 may be heated at a predetermined temperature. The first active material sheet 102' manufactured in this way may include the positive electrode material, the dispersing agent, the binder, and the plasticizer. As described above, the first active material sheet 102' is manufactured using tape casting, for example. However, embodiments are not limited thereto, and the first active material sheet 102' may be manufactured in various ways.

Figure 14:
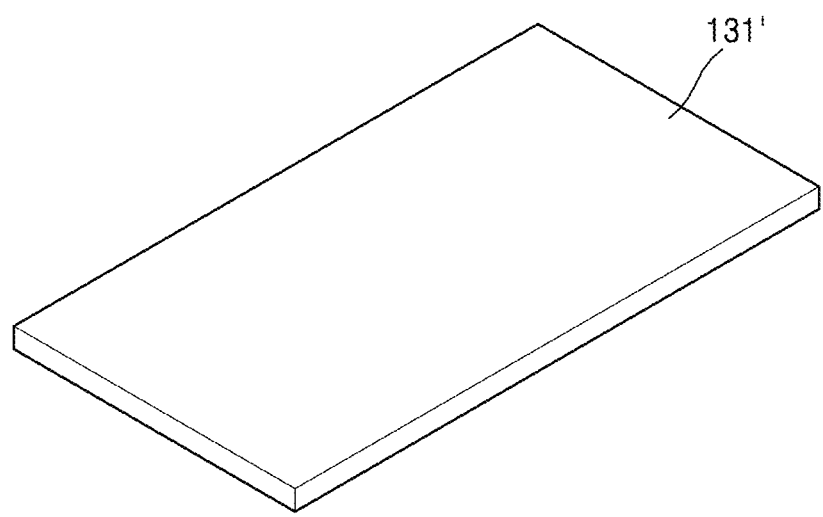

Referring to FIG. 14, sacrificial layer sheet 131' is prepared. Although the sacrificial layer sheet 131' may have a thickness of about 1µ to about 50µ, embodiments are not limited thereto. The sacrificial layer sheet 131' may be provided by manufacturing a slurry including a sacrificial layer material, a dispersing agent, a solvent, a binder, and a plasticizer, for example, in the form of a sheet. Here, for example, $Li_2CoSiO_4$ may be used as the sacrificial layer material. However, embodiments are not limited thereto, and various other materials may be used.

Figure 15:
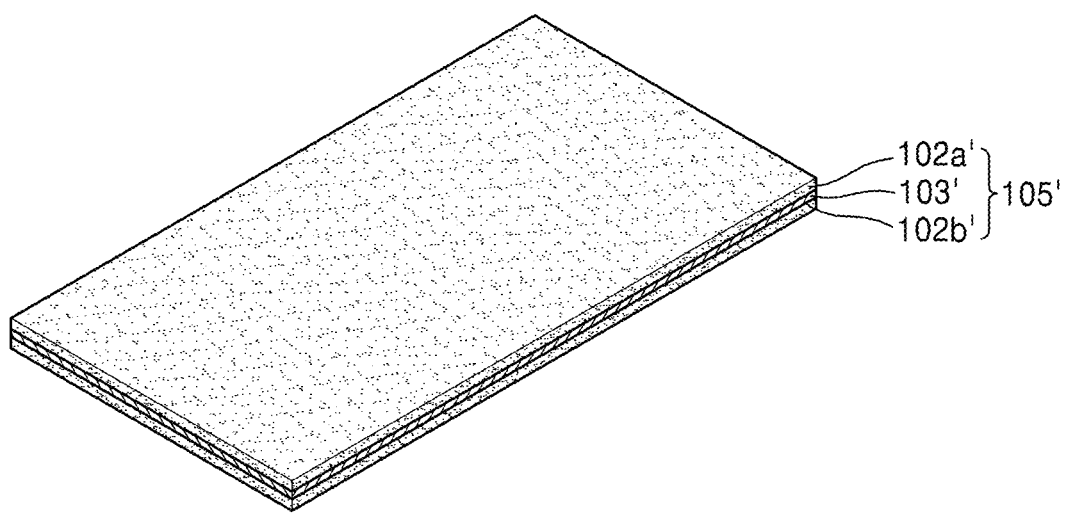

Referring to FIG. 15, a first active material sheet assembly 105' is prepared. The first active material sheet assembly 105' may be manufactured by forming a first conductor sheet 103' on the first active material sheet 102b' and by stacking a first active material sheet 102a' on the first conductor sheet 103'. The first conductor sheet 103' may be provided by coating the first active material sheet 102b' with a paste including a collector material. In an exemplary embodiment, the first conductor sheet 103' may be provided to have a thickness equal to or less than about 1µ, for example, but the embodiments are not limited thereto. In FIG. 15, the first active material sheets 102a' and 102b' are disposed on both sides of the first conductor sheet 103', respectively. However, the first active material sheet 102' may be disposed only on one side of the first conductor sheet 103' so that the first active material sheet assembly 105' may be manufactured.

Figure 16:
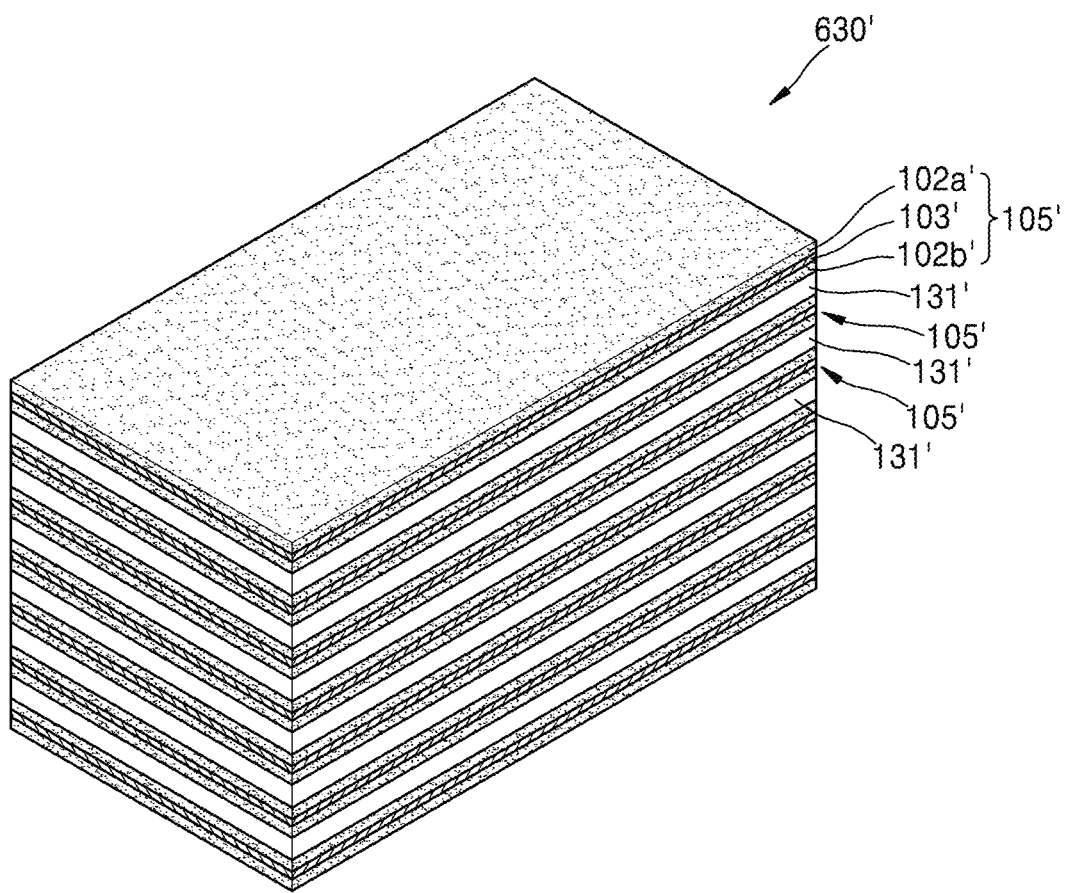
Figure 17:
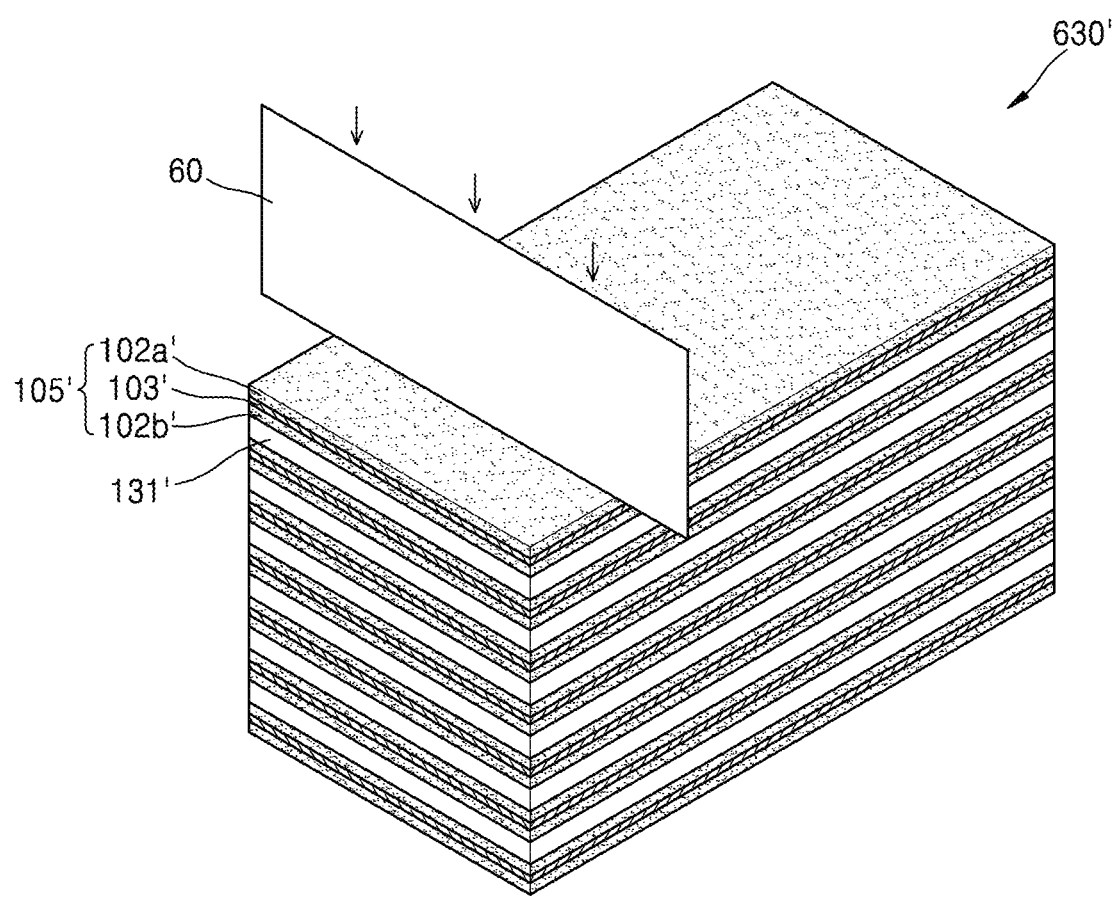
Figure 18:
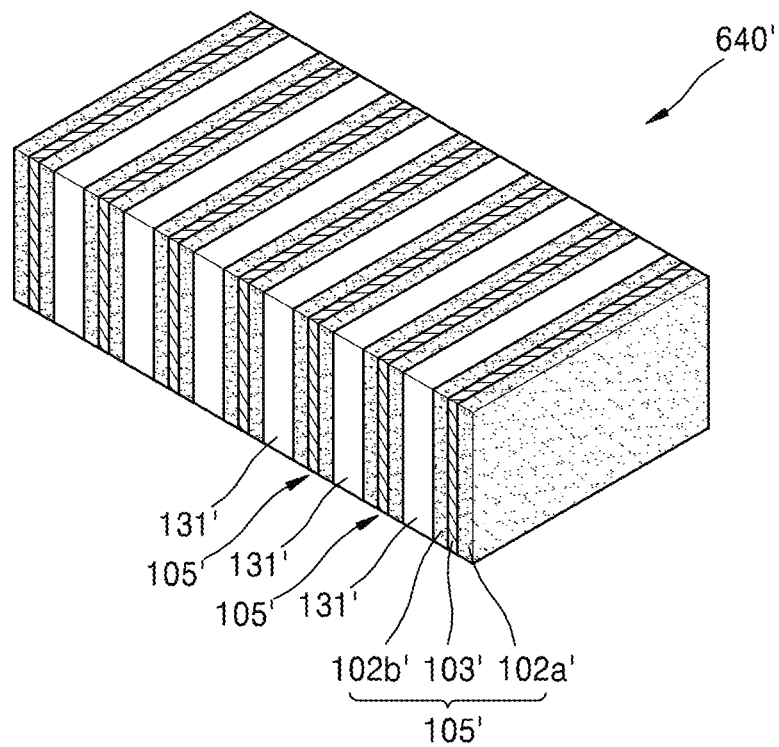

Referring to FIG. 16, at least one first active material sheet assembly 105' and at least one sacrificial layer sheet 131' are alternately repeatedly stacked so that a sheet stack structure 630' may be provided. Here, the number of stacking the first active material sheet assembly 105' and the sacrificial layer sheet 131' may be about 1 time to about 2000 times. However, embodiments are not limited thereto. Subsequently, referring to FIG. 17, the sheet stack structure 630' is cut using a cutter, such as a blade 60, to be divided into a plurality of sheet stack structures 640' of FIG. 18 each having a desired size. One of the divided plurality of sheet stack structures 640' is illustrated in FIG. 18.

Figure 19:
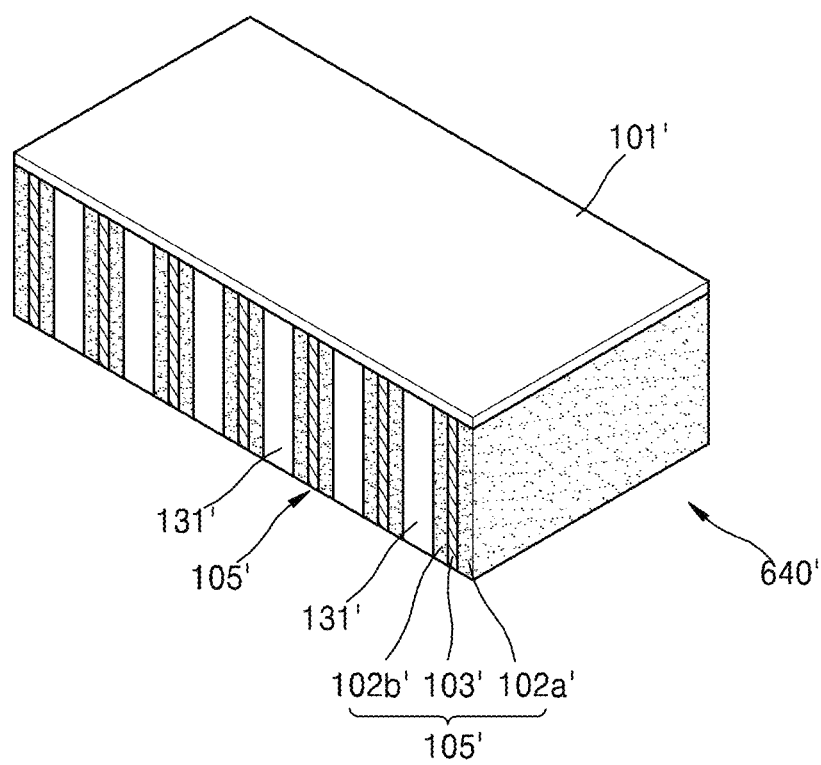

Referring to FIG. 19, a first electrode collector sheet 101' is disposed on the divided sheet stack structure 640'. The first electrode collector sheet 101' is disposed on one surface (a top surface of the sheet stack structure 640' in FIG. 19) of the sheet stack structure 640'. Here, the first electrode collector sheet 101' may be a positive electrode collector paste. The first electrode collector sheet 101' may be provided by coating one surface of the sheet stack structure 640' with a paste including a collector material, such as Al, Ni, Ag, Au, Pt, or Pd. In an exemplary embodiment, the first electrode collector sheet 101' may be provided to have a thickness of about 1µ to about 10µ, for example, but the embodiments are not limited thereto.

Figure 20:
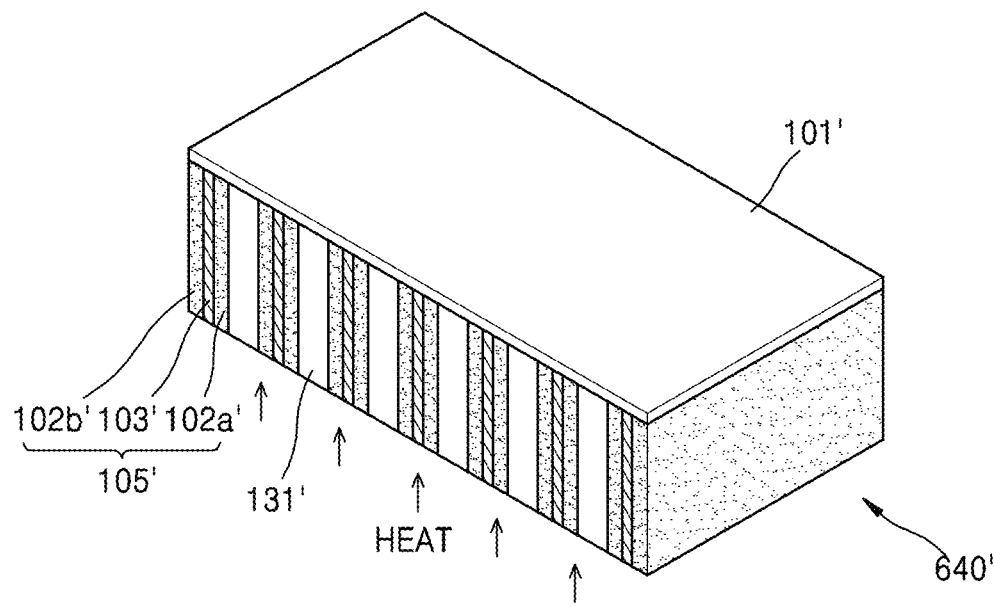

Referring to FIG. 20, the sheet stack structure 640' and the first electrode collector sheet 101' are sintered at a predetermined temperature. Here, the sintering temperature may be about 1000 degrees Celsius (° C.) to about 1050° C., for example. However, embodiments are not limited thereto. Through the sintering process, a sintered stack structure 640 (refer to FIG. 21) and a first electrode collector layer 101 (refer to FIG. 21) are provided. Here, the sintered stack structure 640 includes at least one first active material assembly 105 and at least one sacrificial layer 131. The first active material assembly 105 includes the first conductor layer 103 and the two portions 102a and 102b of the first active material layer 102, respectively disposed on two surfaces of the first conductor layer 103. The first conductor layer 103 may be provided by a sintering process of the first conductor sheet 103' including the paste, and the two portions 102a and 102b of the first active material layer 102 may be provided by a sintering process of the first active material sheets 102a' and 102b'. Also, the sacrificial layers 131 may be provided by a sintering process of the sacrificial layer sheet 131'. Also, the first electrode collector layer 101 may be provided by a sintering process of the first electrode collector sheet 101'.

Figure 21:
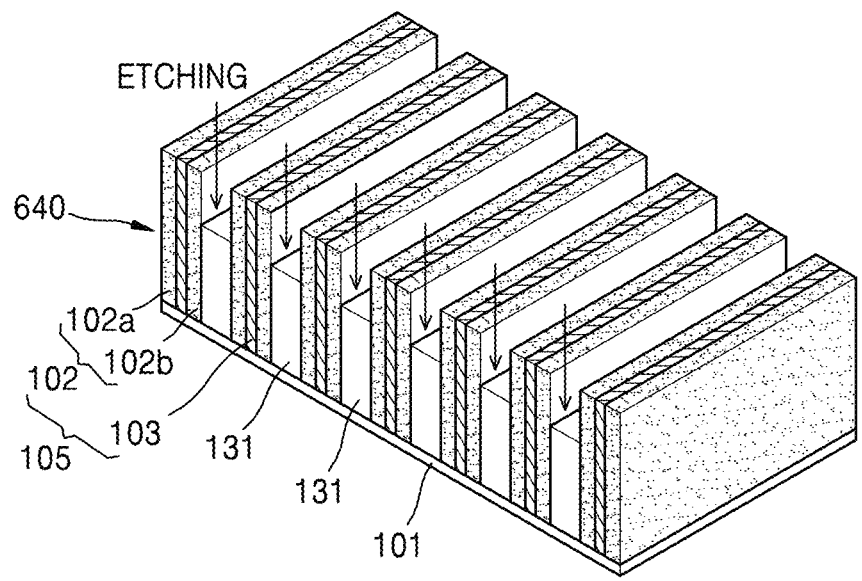

Referring to FIG. 21, the sacrificial layers 131 are removed from the sintered stack structure 640. The sacrificial layers 131 may be removed using an etchant that is used to optionally dry etch or wet etch only the sacrificial layers 131. In an exemplary embodiment, hydrogen fluoride (HF) may be used as the etchant. However, embodiments are not limited thereto, for example.

Figure 22:
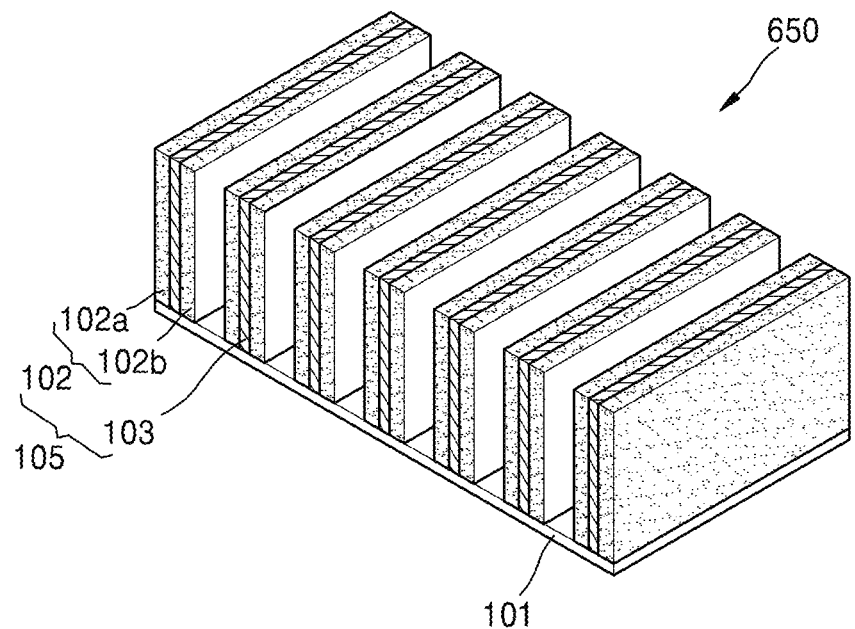

As described above, by removing the sacrificial layers 131, a first electrode structure 650 having a three dimensional ("3D") structure is finished, as illustrated in FIG. 22. The first electrode structure 650 includes the first electrode collector layer 101 and at least one first active material assembly 105 disposed on the first electrode collector layer 101. Here, at least one first active material assembly 105 may be disposed perpendicular to the first electrode collector layer 101. The first active material assembly 105 may include the first conductor layer 103 and the two portions 102*a* and 102*b* of the first active material layer 102 respectively disposed on two surfaces of the first conductor layer 103. The first active material assembly 105 may also include the first conductor layer 103 and a first active material layer 102 disposed on one side of the first conductor layer 103.

Figure 23:
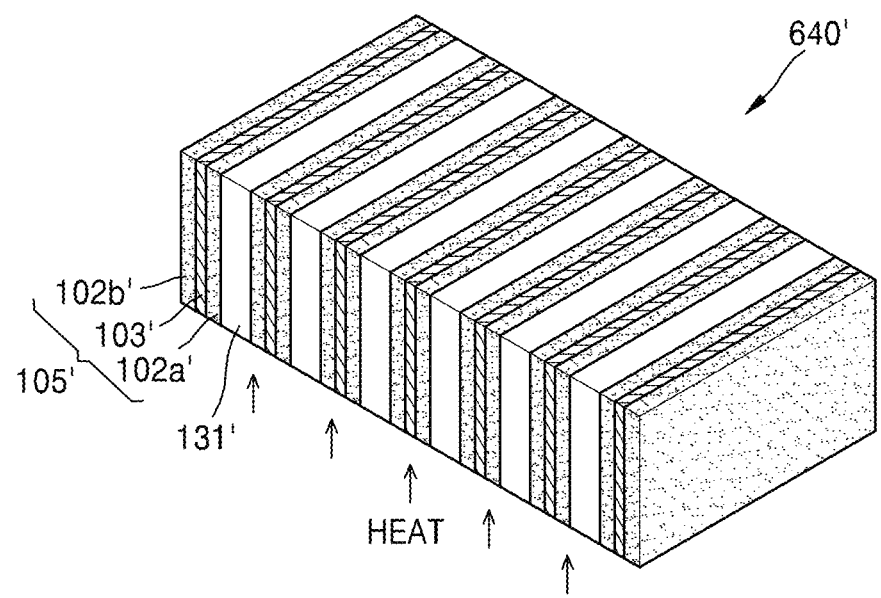
Figure 24:
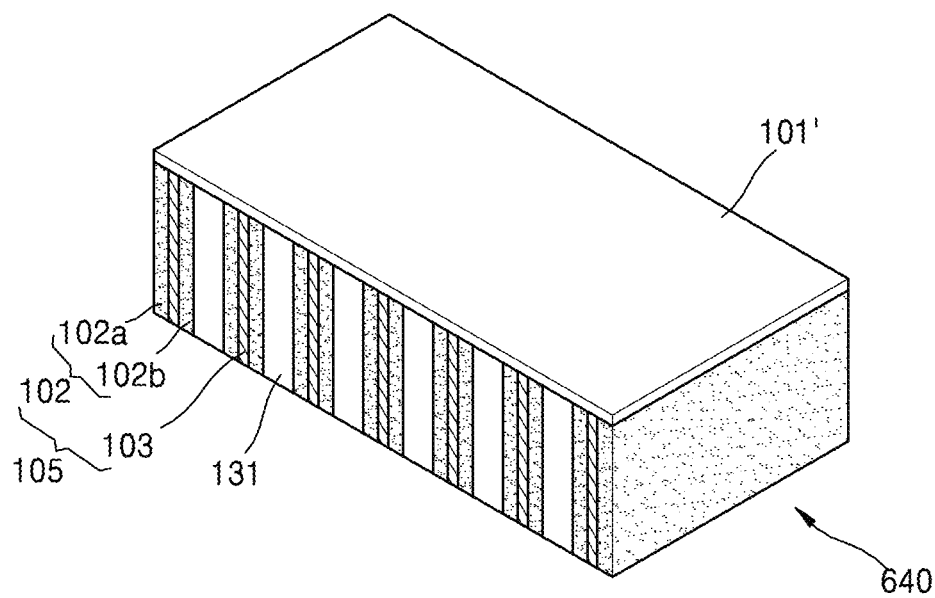
Figure 25:
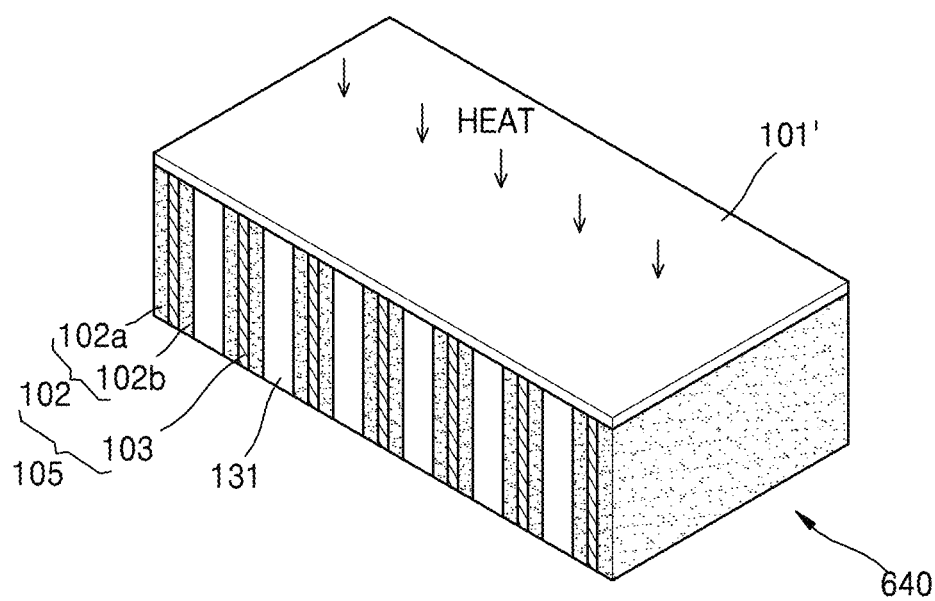

The first electrode structure 650 may be manufactured using different processes from the above-described processes. FIGS. 23 through 25 are diagrams illustrating another exemplary process of manufacturing the first electrode structure 650.

Referring to FIG. 23, after the sheet stack structure 640' illustrated in FIG. 18 is manufactured, the sheet stack structure 640' is sintered at a predetermined temperature. Through the sintering process, a sintered stack structure 640 (refer to FIG. 24) is provided. Here, the sintered stack structure 640 includes at least one first active material assembly 105 and at least one sacrificial layer 131. The first active material assembly 105 includes the first conductor layer 103 and the two portions 102*a* and 102*b* of the first active material layer 102 respectively disposed on both sides of the first conductor layer 103. The first conductor layer 103 may be provided by the sintering process of the first conductor sheet 103' including the paste, and the two portions 102*a* and 102*b* of the first active material layer 102 may be provided by the sintering process of first active material sheets 102*a*' and 102*b*'. Also, the sacrificial layers 131 may be provided by the sintering process of the sacrificial layer sheet 131'.

Referring to FIG. 24, the first electrode collector sheet 101' is disposed on one surface of the sintered stack structure 640. The first electrode collector sheet 101' may be provided by coating one surface of the sintered stack structure 640 with a paste including a collector material, such as Al, Ni, Ag, Au, Pt, or Pd. In an exemplary embodiment, the first electrode collector sheet 101' may be provided to have a thickness of about 1μ to about 10μ, for example, but the embodiments are not limited thereto. Referring to FIG. 25, the first electrode collector sheet 101' including the paste is heat-treated at a predetermined temperature to form the first electrode collector layer 101 (refer to FIG. 21). Subsequently, a process of manufacturing the first electrode structure 650 by etching and removing the sacrificial layers 131, which is the same as described in the above embodiment, is performed.

FIGS. 26 through 30 are diagrams illustrating another exemplary process of manufacturing the first electrode structure 650.

Figure 26:
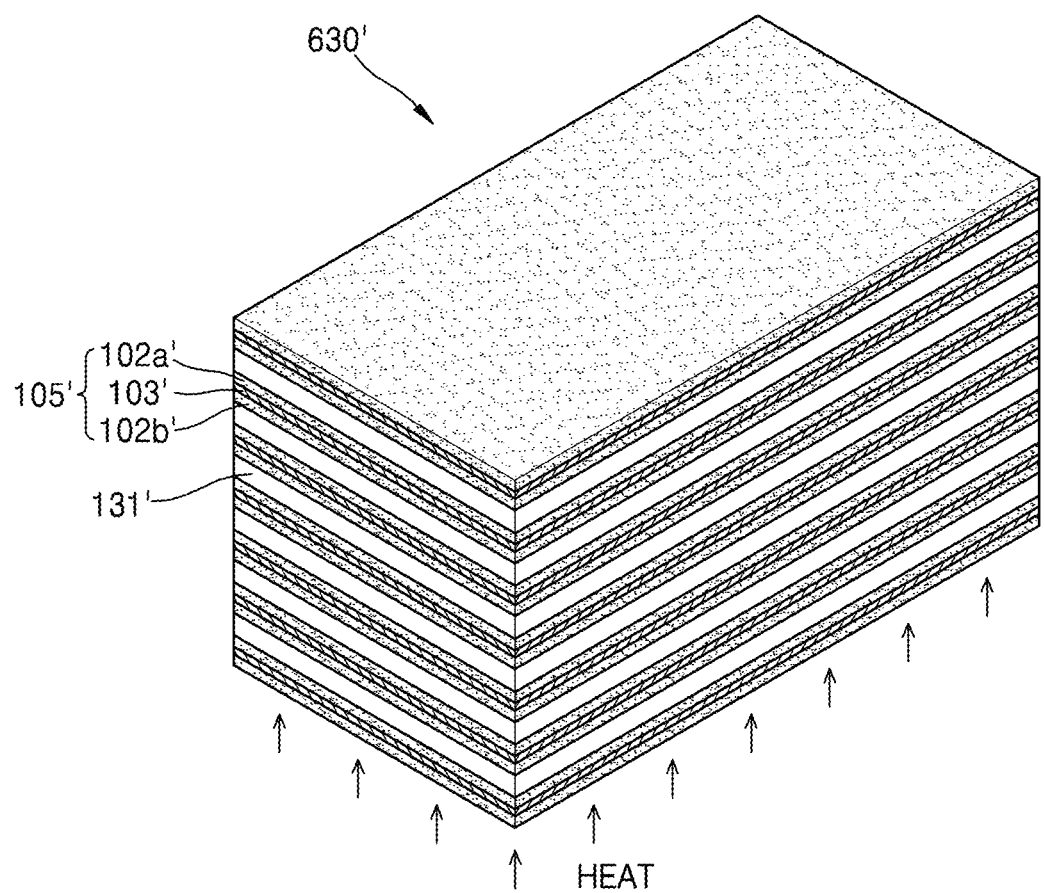

Referring to FIG. 26, after the sheet stack structure 630' illustrated in FIG. 16 is manufactured, the sheet stack structure 630' is sintered at a predetermined temperature. A sintered stack structure 630 (refer to FIG. 27) is provided through the sintering process. Here, the sintered stack structure 630 includes at least one first active material assembly 105 and at least one sacrificial layer 131. The first active material assembly 105 includes the first conductor layer 103 and the two portions 102*a* and 102*b* of the first active material layer 102 respectively disposed on both sides of the first conductor layer 103. The first conductor layer 103 may be provided by the sintering process of the first conductor sheet 103' including the paste, and the two portions 102 and 102*b* of the first active material layer 102 may be provided by the sintering process of first active material sheets 102*a*' and 102*b*'. Also, the sacrificial layers 131 may be provided by the sintering process of the sacrificial layer sheet 131'.

Figure 27:
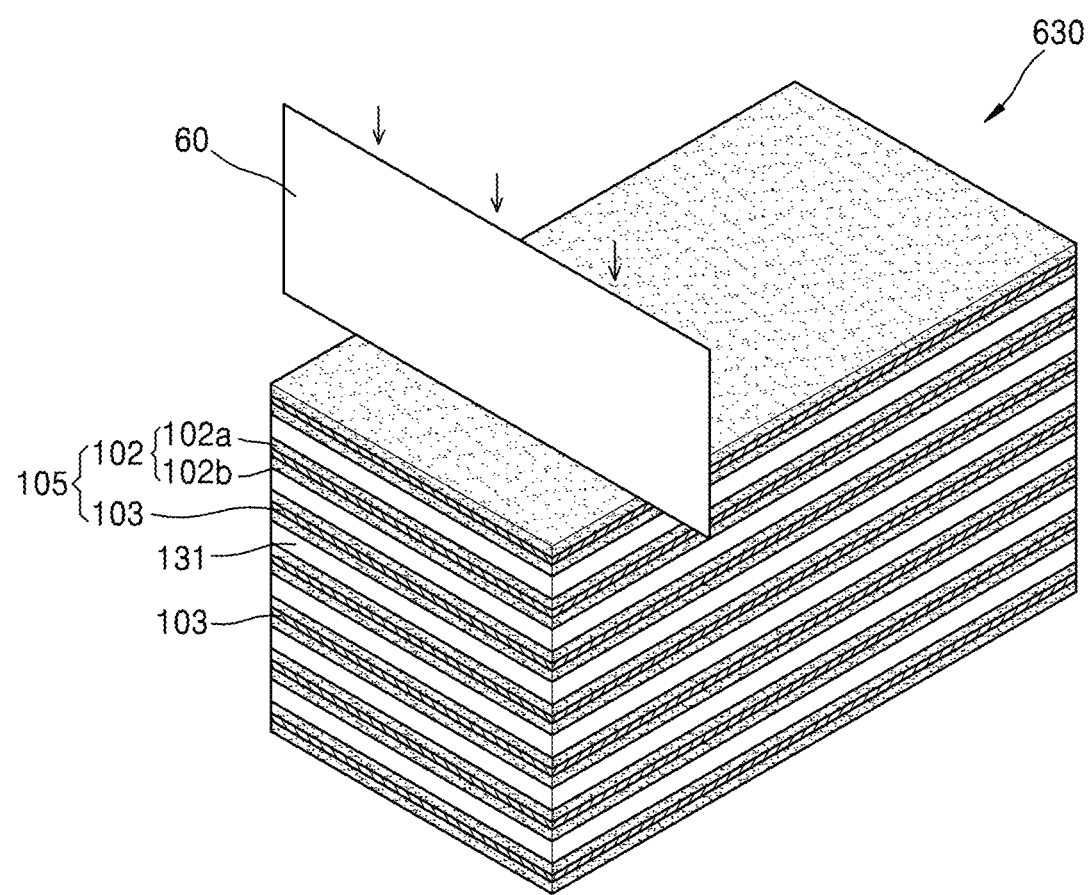
Figure 28:
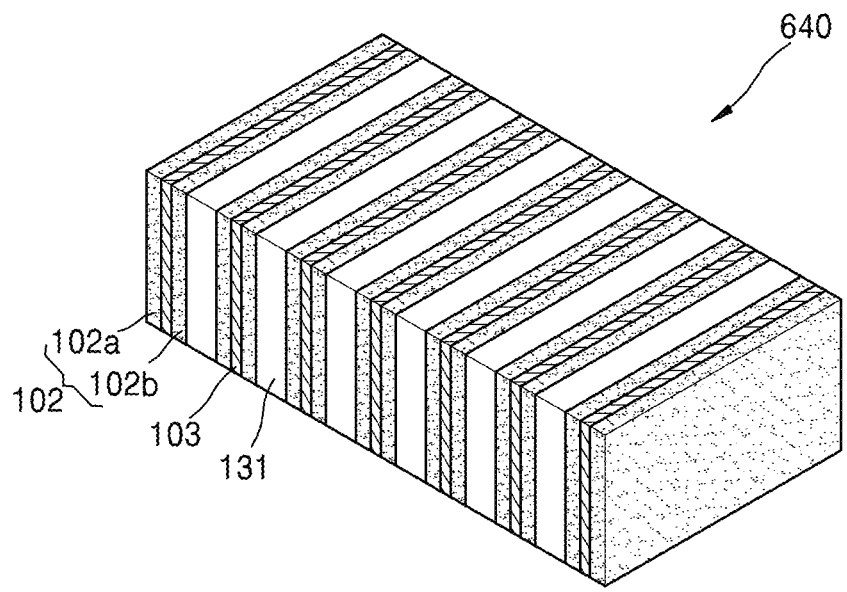
Figure 29:
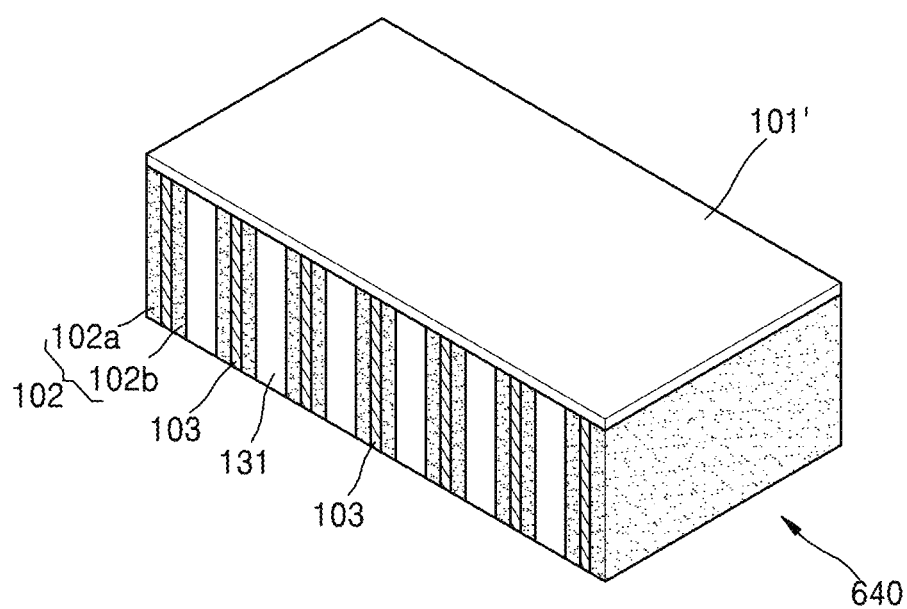
Figure 30:
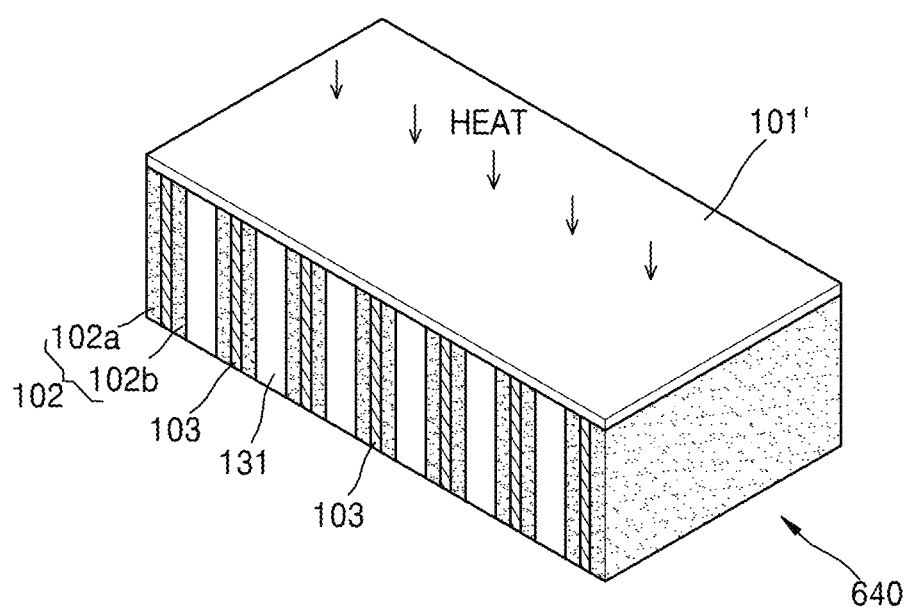

Referring to FIG. 27, the sintered stack structure 630 is cut using the blade 60 and thus is divided into a plurality of sintered stack structures 640 each having a desired size. One of the plurality of divided sintered stack structures 640 is illustrated in FIG. 28. Referring to FIG. 29, the first electrode collector sheet 101' is disposed on one surface of the sintered stack structure 640. In an exemplary embodiment, the first electrode collector sheet 101' may be provided by coating one surface of the sheet stack structure 640 with a paste including a collector material, such as Al, Ni, Ag, Au, Pt, or Pd. Although the first electrode collector sheet 101' may be provided to a thickness of about 1μ to about 10μ, for example, embodiments are not limited thereto. Referring to FIG. 30, the first electrode collector sheet 101' including the paste is heat-treated at a predetermined temperature to form the first electrode collector layer 101. Subsequently, a process of manufacturing the first electrode structure 650 by etching and removing the sacrificial layers 131, which is the same as described in the above embodiment, is performed.

A method of manufacturing the secondary battery 600 including the first electrode structure 650 manufactured as described above will now be described.

Figure 31:
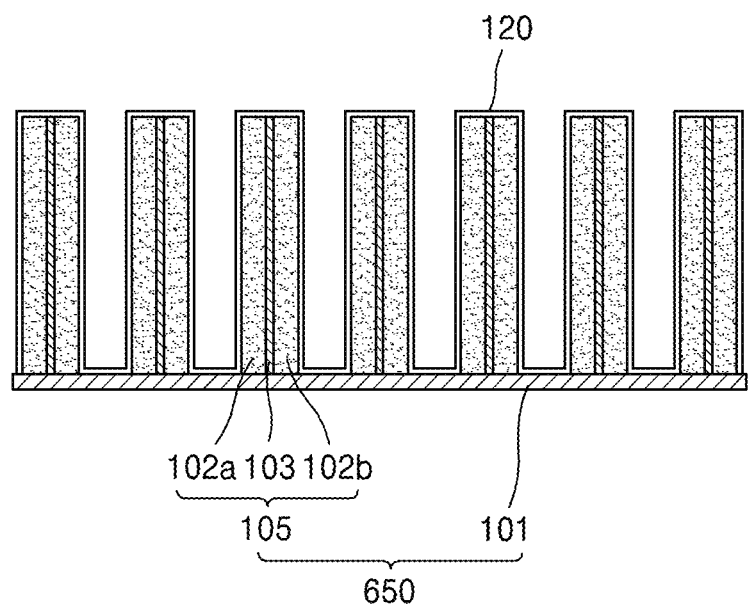

Referring to FIG. 31, the electrolyte layer 120 is disposed on the first electrode structure 650. The electrolyte layer 120 may be deposited on a surface of the first active material assembly 105 and a surface of the first electrode collector layer 101 by performing chemical vapor deposition ("CVD"), atomic layer deposition ("ALD") or sputtering, for example. The electrolyte layer 120 is a solid electrolyte, and may include amorphous ceramics, such as lithium phosphorus oxynitride (LiPON). However, embodiments are not limited thereto. Accordingly, the first surface of the electrolyte layer 120 may be in a zigzag shape to contact the surfaces of the first active material layers 102 and the surface of the first electrode collector layer 101.

Figure 32:
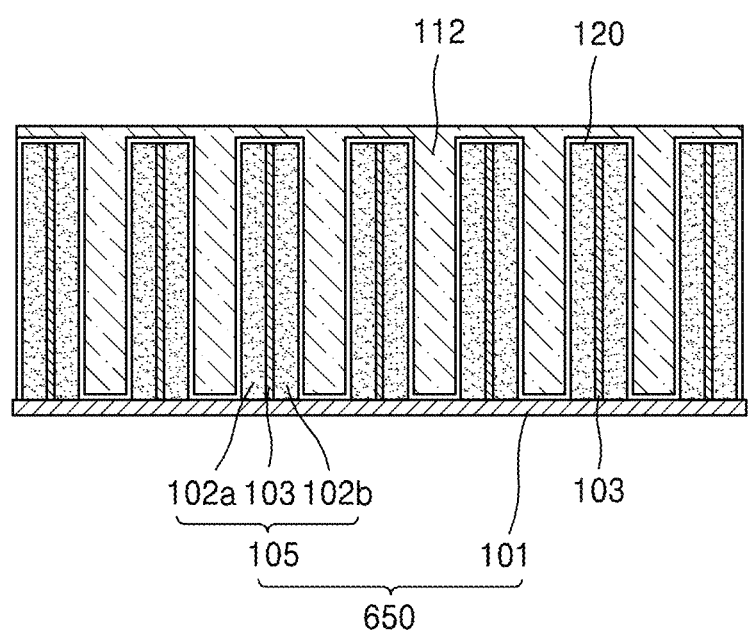

Referring to FIG. 32, a second active material layer 112 is disposed on the electrolyte layer 120. Here, the second active material layer 112 may be provided to fill valleys defined by the second surface of the electrolyte layer 120 in a zigzag shape between the first active material assemblies 105. The second active material layer 112 may be a negative electrode. In this case, the second active material layer 112 may include lithium, but embodiments are not limited thereto. The second active material layer 112 may be provided by depositing lithium on the electrolyte layer 120 using evaporation or by filling valleys between the first active material assembly 105 with molten lithium by osmotic pressure, for example. However, embodiments are not limited thereto, and the second active material layer 112 may be provided using other methods.

Figure 33:
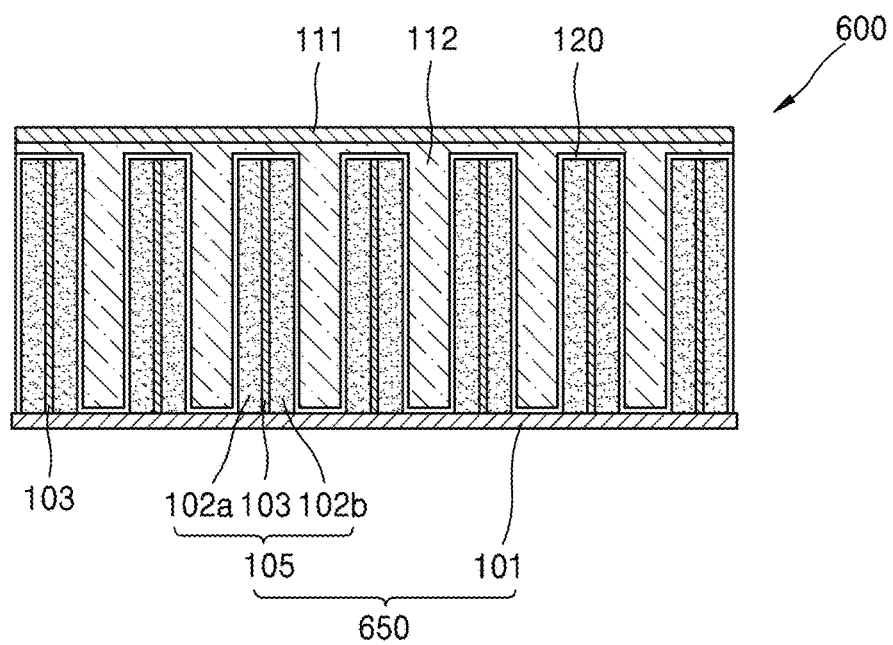

Referring to FIG. 33, a second electrode collector layer 111 is disposed on the second active material layer 112 to complete the manufacture of the secondary battery 600. Here, the second electrode collector layer 111 that is a negative electrode collector may include copper (Cu), for example, but embodiments are not limited thereto.

As described above, as first active material sheet 102' and sacrificial layer sheet 131' are used, a time required to manufacture the first electrode structure 650 having a 3D structure may be reduced. Also, since the ratio of a length of the first active material assembly 105 with respect to a width of the first active material assembly 105 in the first electrode structure 650, i.e., an aspect ratio of the first active material assembly 105 may be greatly increased so that an energy density of the secondary battery 600 may be improved. As above, the case where the first and second active material layers 102 and 112 are a positive electrode active material and a negative electrode active material, respectively, has been described. However, embodiments are not limited thereto, and the first and second active material layers 102 and 112 may also be a negative electrode active material and a positive electrode active material, respectively.

Figure 34:
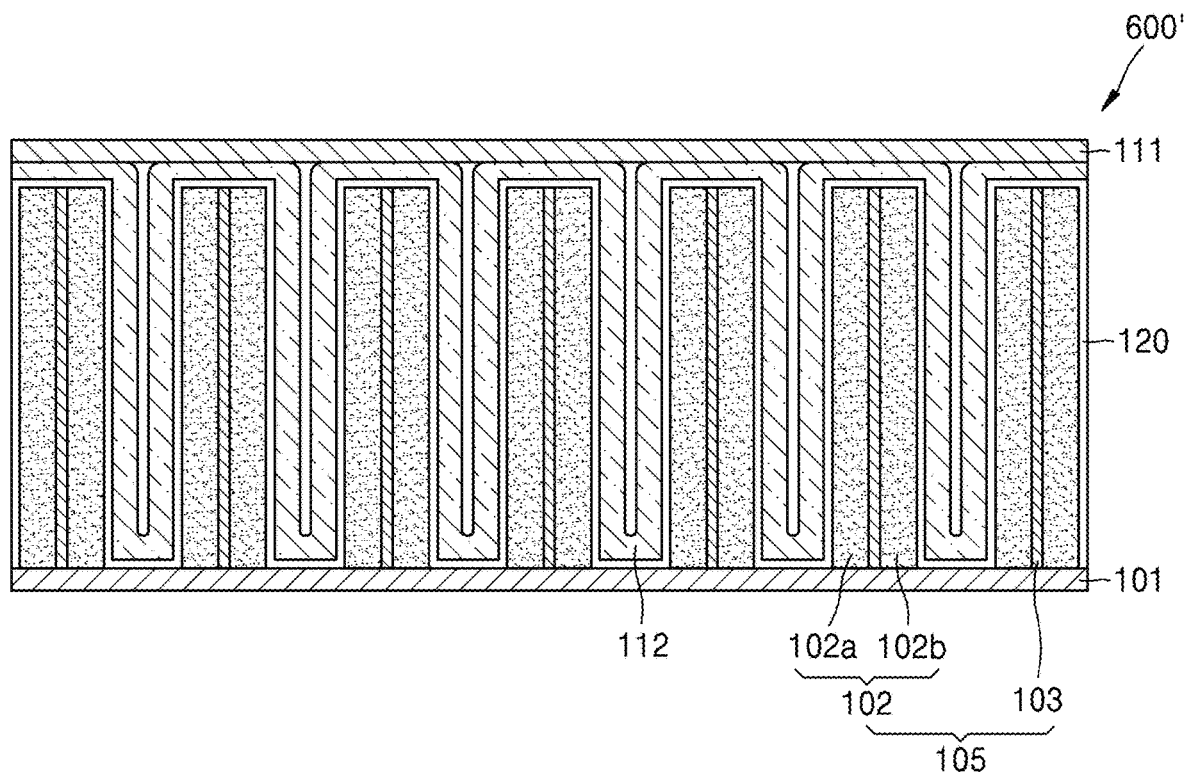
FIG. 34 is a cross-sectional view of another exemplary embodiment of a structure of a secondary battery.

FIG. 34 is a cross-sectional view of a structure of a secondary battery 600' according to another exemplary embodiment. In FIG. 11, the second active material layers 112 completely fills a valley defined by the second surface of the electrolyte layer 120 that is provided in a zigzag shape. However, as illustrated in FIG. 34, similarly to the electrolyte layer 120, the second active material layers 112 may be provided in a zigzag shape along the second surface of the electrolyte layer 120. Accordingly, an empty space in which the second active material layer 112 is not filled may be defined between the first active material assemblies 105. In an exemplary embodiment, the empty space may be provided by adjusting an amount of a second active material deposited while forming the second active material layer 112, for example. Such an empty space may operate as a buffer space for easing an overall volume change of the secondary battery 600' according to volume changes of the first and second active material layer 102 and 112 during charging and discharging operations of the secondary battery 600'.

Figure 35:
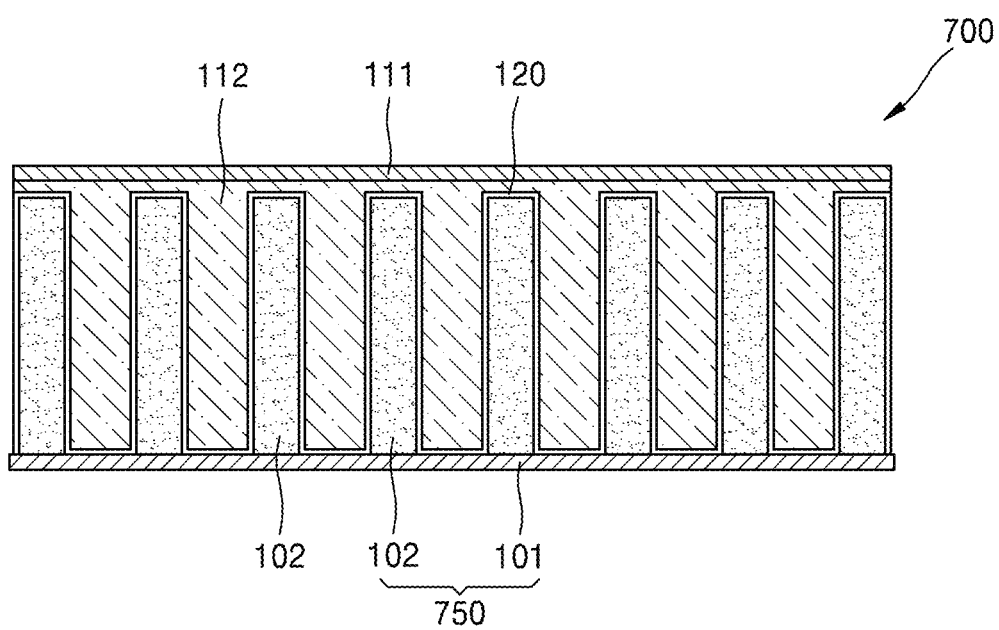
FIG. 35 is a cross-sectional view of another exemplary embodiment of a structure of a secondary battery.

FIG. 35 is a cross-sectional view of a structure of a secondary battery 700 according to another exemplary embodiment.

Referring to FIG. 35, a secondary battery 700 may include a first electrode structure 750 having a 3D structure, and the electrolyte layer 120, the second active material layer 112, and the second electrode collector layer 111, which are sequentially disposed on the first electrode structure 750. The first electrode structure 750 includes a first electrode collector layer 101 and at least one first active material layer 102 disposed on the first electrode collector layer 101. The first active material layer 102 may be disposed perpendicular to the first electrode collector layer 101. The first electrode structure 750 may be a positive electrode structure, for example. However, embodiments are not limited thereto, and the first electrode structure 750 may also be a negative electrode structure.

The electrolyte layer 120 is disposed on a surface of the first electrode structure 750. The electrolyte layer 120 may be deposited, in a zigzag shape, on a surface of the first active material layer 102 and a surface of the first electrode collector layer 101. The second active material layer 112 is disposed on the electrolyte layer 120. Here, the second active material layer 112 may be provided to fill spaces between the first active material layers 102. The second electrode collector layer 111 is disposed on the second active material layer 112. When the first electrode structure 750 is a positive electrode structure, the second active material layer 112 and the second electrode collector layer 111 may be a negative electrode and a negative electrode collector, respectively. Also, when the first electrode structure 750 is a negative electrode structure, the second active material layer 112 and the second electrode collector layer 111 may be a positive electrode and a positive electrode collector, respectively.

FIGS. 36 through 41 are diagrams for describing a method of manufacturing the secondary battery 700 of FIG. 35.

Figure 36:
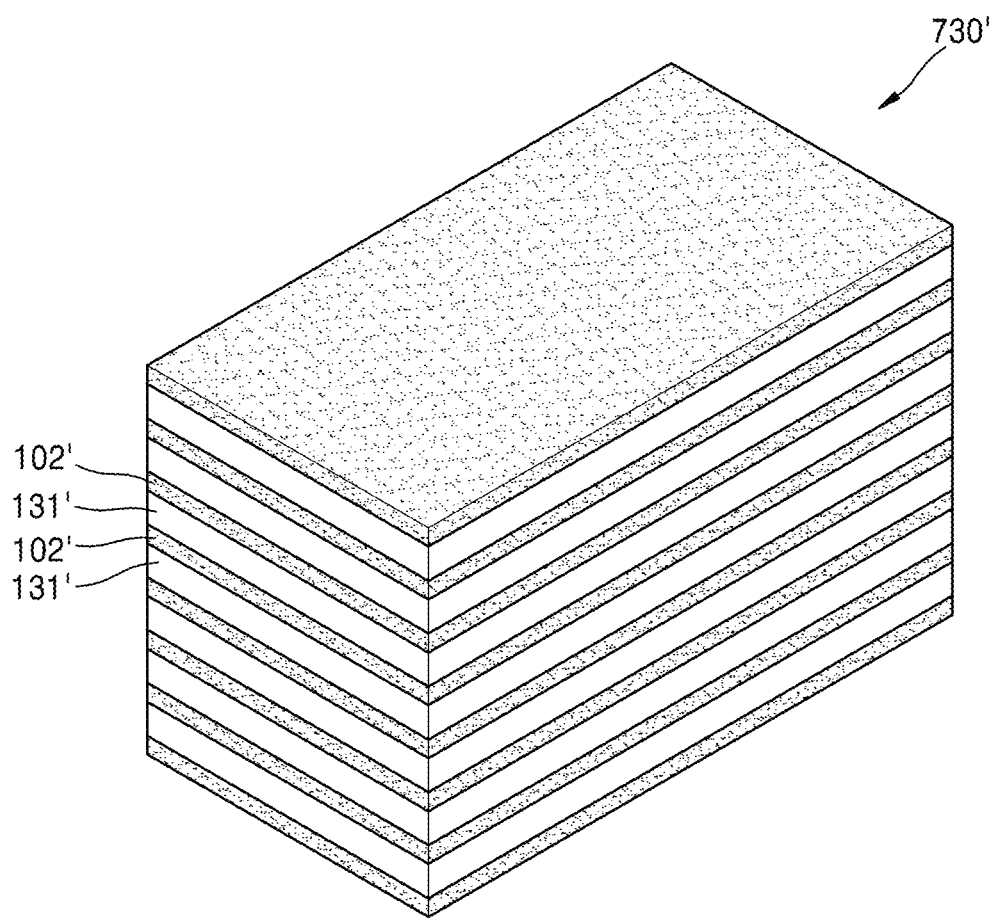
FIGS. 36 through 41 are diagrams for describing a method of manufacturing the secondary battery of FIG. 35.
Figure 37:
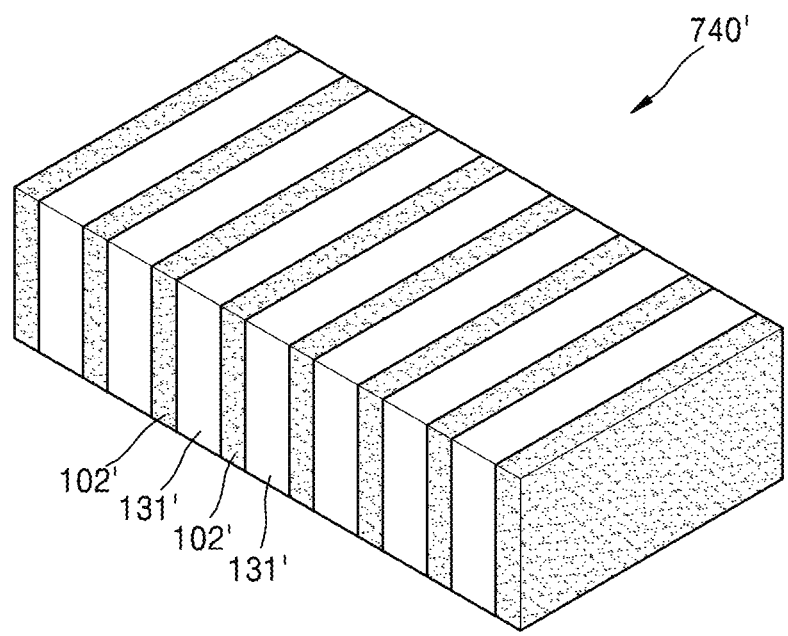

Referring to FIG. 36, at least one first active material sheet 102' and at least one sacrificial layer sheet 131' are alternately stacked so that a sheet stack structure 730' may be provided. Here, the first active material sheet 102' may have a thickness of about 1μ to about 30μ, and the sacrificial layer sheet 131' may have a thickness of about 1μ to about 30μ, for example. However, embodiments are not limited thereto. The manufacturing of the first active material sheet 102' and the sacrificial layer sheet 131' has been described above and thus a description thereof will be omitted. Subsequently, the sheet stack structure 730' is cut using the blade 60 (refer to FIG. 17) and is divided into a plurality of sheet stack structures 740' each having a desired size. One of the plurality of divided sheet stack structures 740' is illustrated in FIG. 37.

Figure 38:
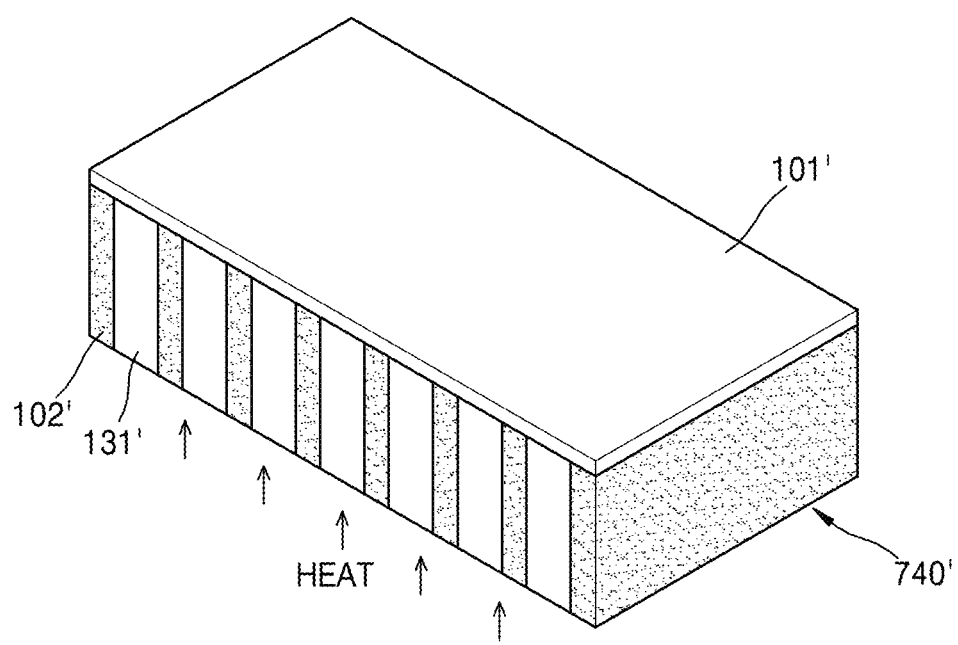

Referring to FIG. 38, the first electrode collector sheet 101' is disposed on one surface of the divided sheet stack structure 740'. In an exemplary embodiment, the first electrode collector sheet 101' may be provided by coating one surface of the sheet stack structure 740' with a paste including a collector material, such as Al, Ni, Ag, Au, Pt, or Pd. In an exemplary embodiment, the first electrode collector sheet 101' may be provided to have a thickness of about 1μ to about 10μ, but the embodiments are not limited thereto. Next, the sheet stack structure 740' and the first electrode collector sheet 101' are sintered at a predetermined temperature. Here, the sintering temperature may be about 1000° C. to about 1050° C., for example, but embodiments are not limited thereto. Through the sintering process, a sintered stack structure 740 (refer to FIG. 39) and a first electrode collector layer 101 (refer to FIG. 39) are provided. Here, the sintered stack structure 740 includes at least one first active material layer 102 and at least one sacrificial layer 131. The first active material layer 102 may be provided by the sintering process of the first active material sheet 102', and the sacrificial layers 131 may be provided by the sintering process of the sacrificial layer sheet 131'. Also, the first electrode collector layer 101 may be provided by the sintering process of the first electrode collector sheet 101' including the paste.

Figure 39:
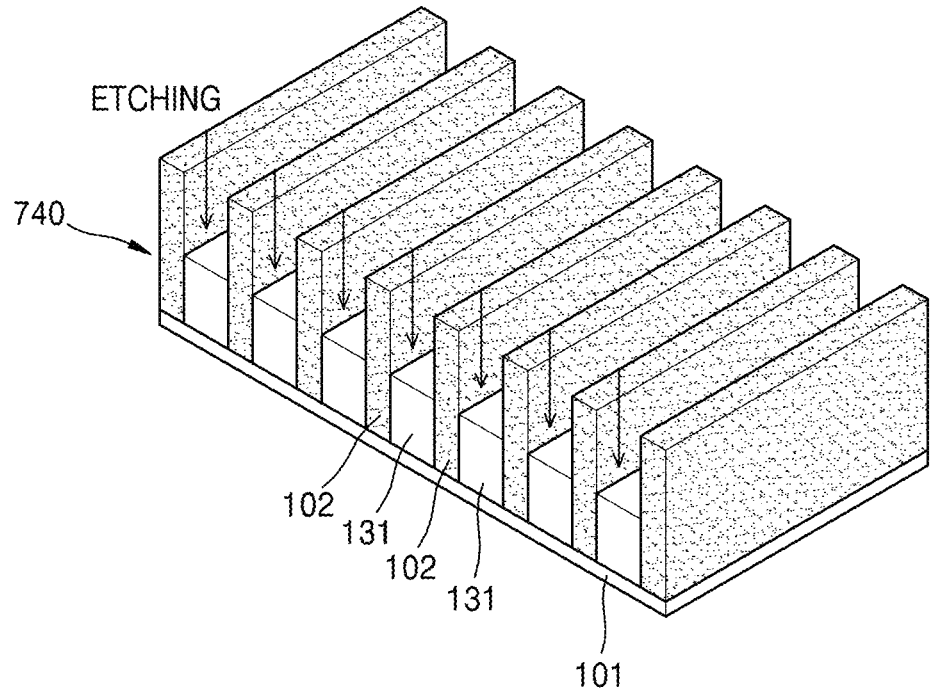
Figure 40:
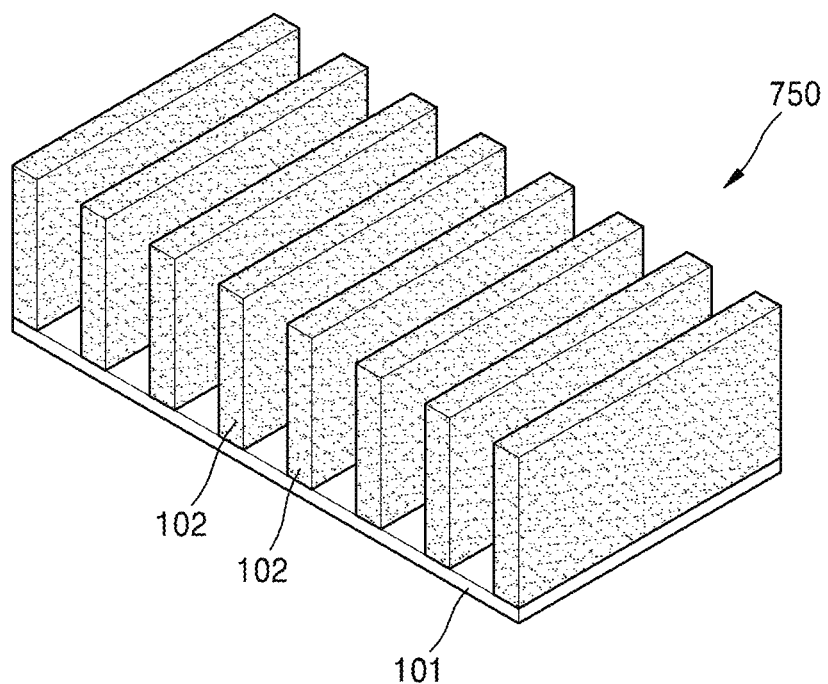

Referring to FIG. 39, the sacrificial layers 131 are removed from the sintered stack structure 740 by etching. In this way, when the sacrificial layers 131 are removed, as illustrated in FIG. 40, the first electrode structure 750 having the 3D structure is finished. The first electrode structure 750 includes the first electrode collector layer 101 and at least one first active material layer 102 disposed on the first electrode collector layer 101. Here, at least one first active material layer 102 may be disposed perpendicular to the first electrode collector layer 101.

As above, it is described that the first electrode structure 750 is manufactured by the sintering process and a sacrificial layer removing process after the first electrode collector sheet 101' is disposed on one surface of the divided sheet stack structure 740'. However, the first electrode structure 750 may also be manufactured by performing similar processes to the processes illustrated in FIGS. 23 through 25. That is, after the divided sheet stack structure 740' is sintered and thus the sintered stack structure 740 is provided, the first electrode collector layer 101 is disposed on one surface of the sintered stack structure 740. Subsequently, the first electrode structure 750 may be manufactured by performing a process of removing the sacrificial layers 131. Also, the first electrode structure 750 may also be manufactured by performing similar processes to those of FIGS. 26 through 30. That is, after the sheet stack structure 740' is sintered and thus the sintered stack structure 740 is provided, the sintered stack structure 740 is cut and thus is divided into the plurality of sintered stack structures 740. Then, the first electrode collector layer 101 is disposed on one surface of the divided, sintered stack structure 740, and the sacrificial layers 131 are removed so that the first electrode structure 750 may be manufactured.

Figure 41:
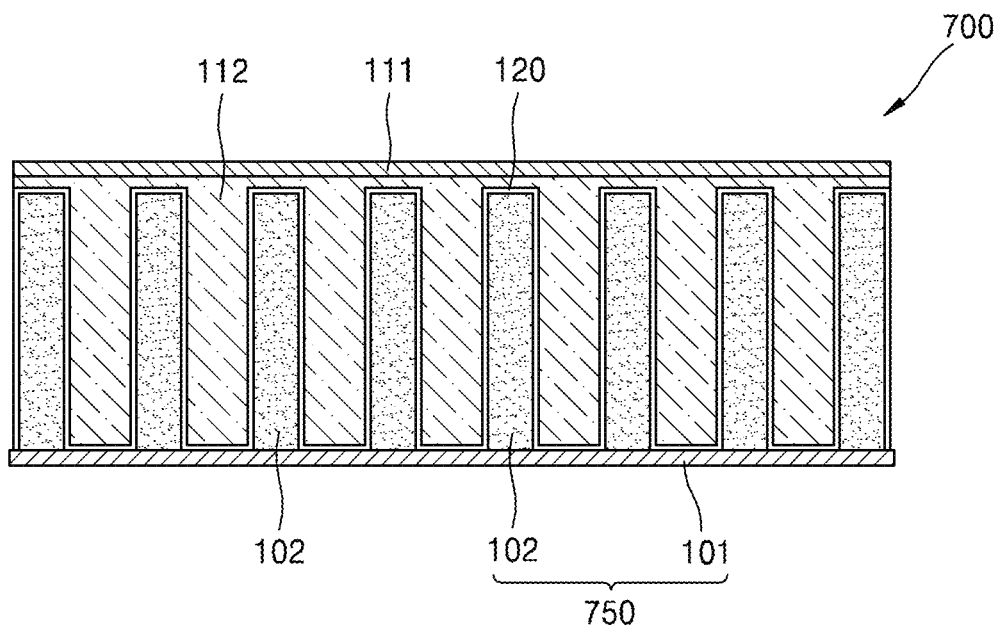

Referring to FIG. 41, the electrolyte layer 120, the second active material layer 112, and the second electrode collector layer 111 are sequentially disposed on the first electrode structure 750 manufactured by the above-described processes so that the secondary battery 700 may be finished.

Figure 42:
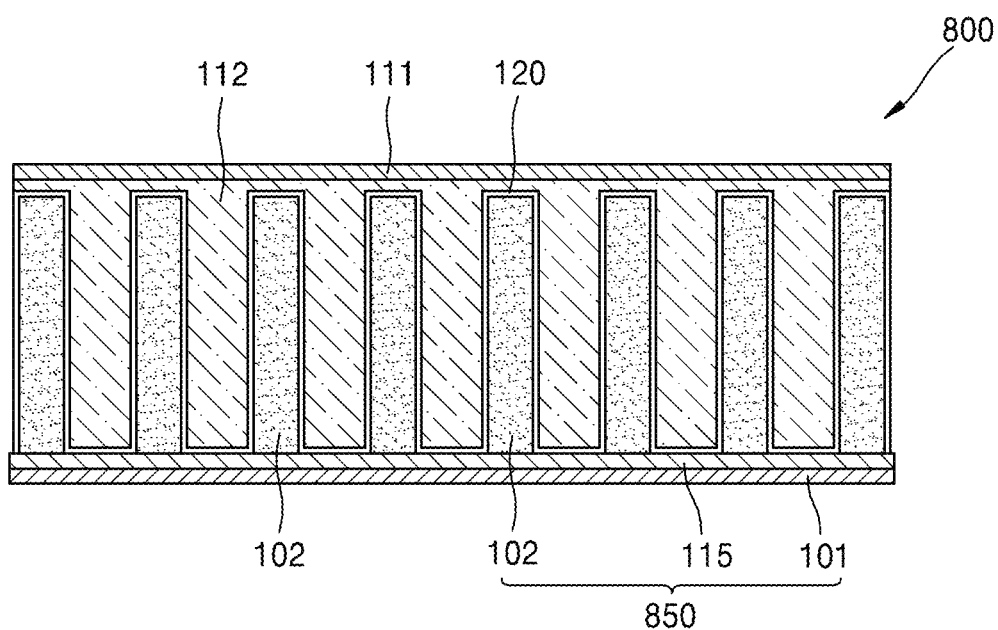
FIG. 42 is a cross-sectional view of another exemplary embodiment of a structure of a secondary battery.

FIG. 42 is a cross-sectional view of a structure of a secondary battery 800 according to another exemplary embodiment.

Referring to FIG. 42, a secondary battery 800 may include a first electrode structure 850 having a 3D structure, and the electrolyte layer 120, the second active material layer 112, and the second electrode collector layer 111, which are sequentially disposed on the first electrode structure 850. The first electrode structure 850 includes a first electrode collector layer 101, a base layer 115 disposed on the first electrode collector layer 101, and at least one first active material layer 102 disposed on the base layer 115. The base layer 115 and the first active material layer 102 may include the same active material. The first active material layers 102 may be disposed perpendicular to the first electrode collector layer 101 and the base layer 115. The first electrode structure 850 may be a positive electrode structure, for example. However, embodiments are not limited thereto, and the first electrode structure 850 may be a negative electrode structure.

The electrolyte layer 120 is disposed on the first electrode structure 850. The electrolyte layer 120 may be deposited, in a zigzag shape, on a surface of each of the first active material layers 102 and a surface of the base layer 115. The second active material layer 112 is provided in the electrolyte layer 120. Here, the second active material layer 112 may be provided to fill spaces between the first active material layers 102. The second electrode collector layer 111 is disposed on the second active material layers 112. When the first electrode structure 850 is a positive electrode structure, the second active material layer 112 and the second electrode collector layer 111 may be a negative electrode and a negative electrode collector, respectively. Also, when the first electrode structure 850 is a negative electrode structure, the second active material layer 112 and the second electrode collector layer 111 may be a positive electrode and a positive electrode collector, respectively.

FIGS. 43 through 47 are diagrams for describing a method of manufacturing the secondary battery 800 of FIG. 42.

Figure 43:
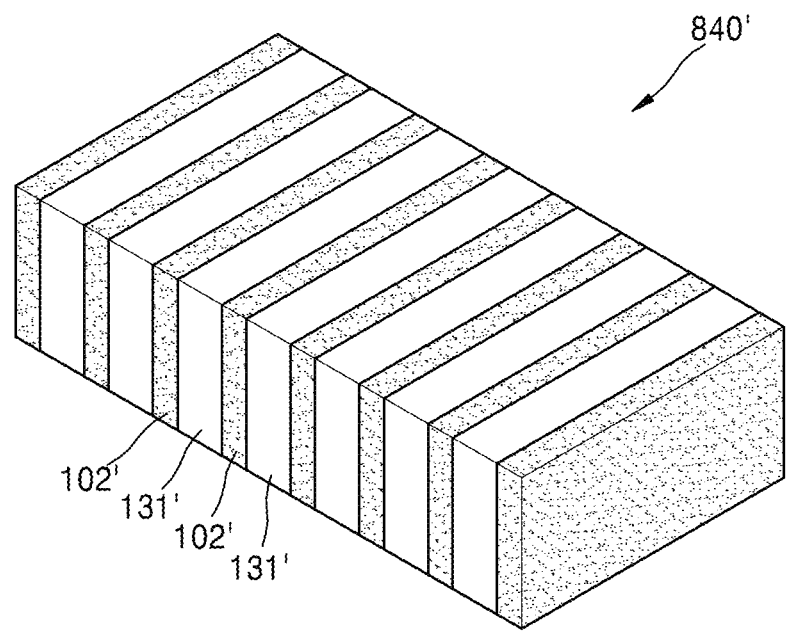
FIGS. 43 through 47 are diagrams for describing a method of manufacturing the secondary battery of FIG. 42.

Referring to FIG. 43, at least one first active material sheet 102' and at least one sacrificial layer sheet 131' are alternately stacked so that a sheet stack structure may be provided. Manufacturing of the first active material sheets 102' and the sacrificial layer sheets 131' has been described above and thus, a description thereof will be omitted. Subsequently, the sheet stack structure is cut using a blade and thus is divided into a plurality of sheet stack structures 840' each having a desired size. One of the plurality of divided sheet stack structures 840' is illustrated in FIG. 43.

Figure 44:
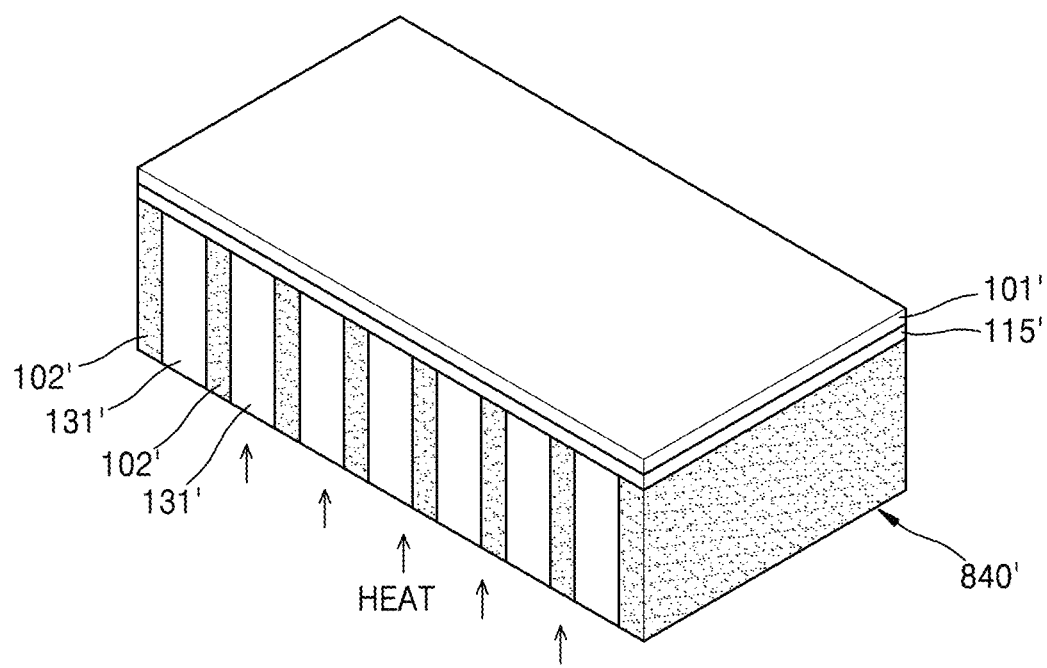

Referring to FIG. 44, a base sheet 115' and the first electrode collector sheet 101' are sequentially disposed on one surface of the sheet stack structure 840'. The base sheet 115' may be manufactured in the same way to that of the first active material sheet 102' using the same material as that of the first active material sheet 102'. The first electrode collector sheet 101' may be provided by coating the base sheets 115' with a paste including a collector material, such as Al, Ni, Ag, Au, Pt, or Pd. Next, the sheet stack structure 840', the base sheet 115', and the first electrode collector sheet 101' are sintered at a predetermined temperature. Through the sintering process, the stack structure 840 (refer to FIG. 45), the base layer 115 (refer to FIG. 45), and the first electrode collector layer 101 (refer to FIG. 45) are provided. Here, the stack structure 840 includes at least one first active material layer 102 and at least one sacrificial layer 131. At least one first active material layer 102 may be provided by the sintering process of the first active material sheets 102', and at least one sacrificial layer 131 may be provided by the sintering process of the sacrificial layer sheets 131'. Also, the base layer 115 may be provided by the sintering process of the base sheets 115', and the first electrode collector layer 101 may be provided by the sintering process of the first electrode collector sheet 101' including the paste.

Figure 45:
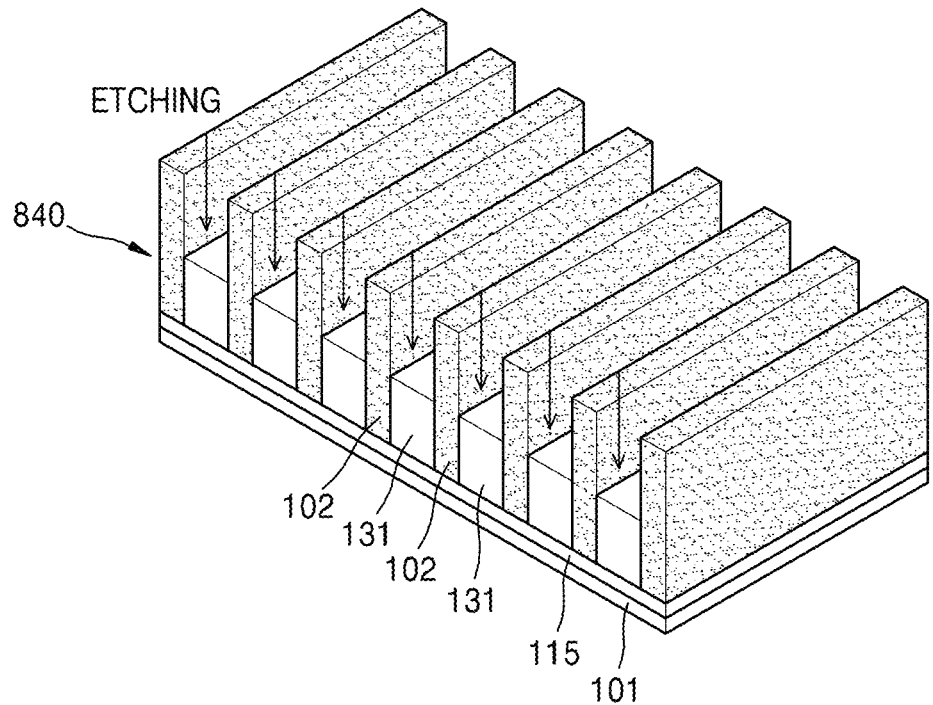
Figure 46:
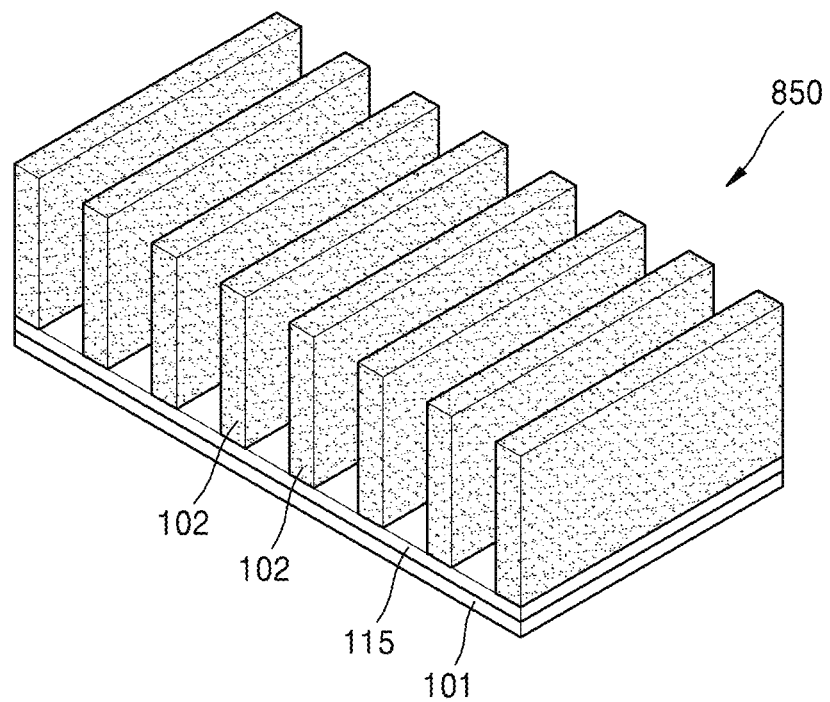

Referring to FIG. 45, the sacrificial layers 131 are removed from the sintered stack structure 840 by etching. Thus, the first electrode structure 850 having the 3D structure is finished, as illustrated in FIG. 46. The first electrode structure 850 includes the first electrode collector layer 101, the base layer 115 disposed on the first electrode collector layer 101, and at least one first active material layer 102 disposed on the base layer 115. Here, at least one first active material layer 102 may be disposed perpendicular to the first electrode collector layer 101 and the base layer 115.

As above, the method of manufacturing the first electrode structure 850 by performing the sintering process and the process of removing the sacrificial layers 131 after forming the base sheets 115' and the first electrode collector sheet 101' on one surface of the divided sheet stack structure 840' has been described. However, the first electrode structure 850 may be manufactured by performing similar processes to those of FIGS. 23 through 25. That is, after the stack structure 840 is provided by sintering the divided sheet stack structure 840', the base layer 115, and the first electrode collector layer 101 are disposed on one surface of the stack structure 840. Subsequently, the first electrode structure 850 may be manufactured by performing a process of removing the sacrificial layers 131. Also, the first electrode structure 850 may also be manufactured by performing similar processes to those of FIGS. 26 through 30. That is, after the stack structure is provided by sintering the sheet stack structure, the stack structure is cut and thus is divided into a plurality of stack structures 840. Then, the base layer 115 and the first electrode collector layer 101 are disposed on one surface of the divided stack structure 840, and the sacrificial layers 131 are removed so that the first electrode structure 850 may be manufactured.

Figure 47:
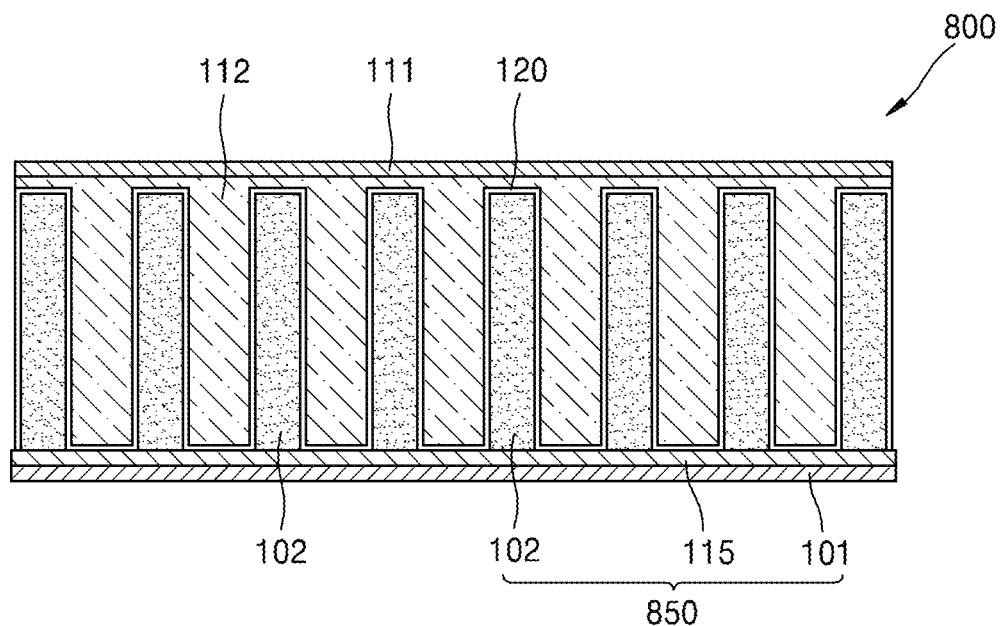

Referring to FIG. 47, the electrolyte layer 120, the second active material layer 112, and the second electrode collector layer 111 are sequentially disposed on the first electrode structure 850 so that the secondary battery 800 may be finished.

Figure 48:
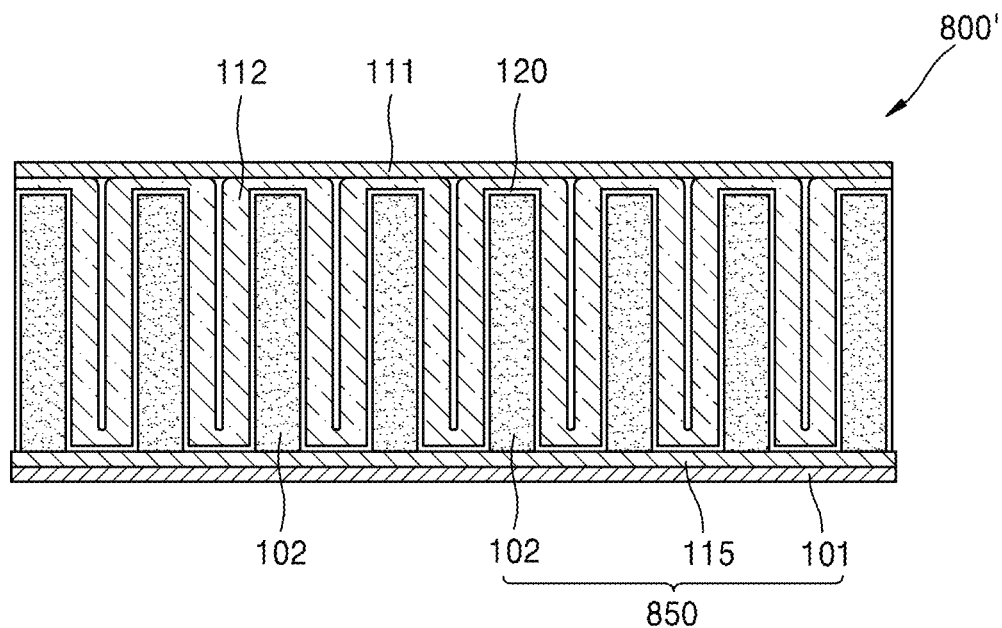
FIG. 48 is a cross-sectional view of another exemplary embodiment of a structure of a secondary battery.

FIG. 48 is a cross-sectional view of a structure of a secondary battery 800' according to another exemplary embodiment. In the secondary battery 800 of FIG. 42, the second active material layers 112 completely fill the valley defined by the electrolyte layer 120 in a zigzag shape between the first active material layers 102. However, as shown in FIG. 48, the second active material layers 112 may be provided in a zigzag shape along the surface of the electrolyte layer 120, like the electrolyte layer 120. Accordingly, an empty space in which the second active material layer 112 is not filled may be defined between the first active material layers 102. In an exemplary embodiment, the empty space may be provided by adjusting an amount of depositing a second active material while forming the second active material layer 112, for example. Such an empty space may operate as a buffer space for easing an overall volume change of the secondary battery 800' according to volume changes of the first and second active material layers 102 and 112 during charging and discharging operations of the secondary battery 800'.

While one or more exemplary embodiments have been described with reference to the figures, it will be understood by those of ordinary skill in the art that various changes in form and details may be made therein without departing from the spirit and scope as defined by the following claims.

What is claimed is:

1. A battery comprising:
a first electrode collector layer having a plate shape;
a plurality of first active material layers which electrically contact the first electrode collector layer and are substantially perpendicular to the first electrode collector layer;
a plurality of conductor layers, each of which electrically contacts the first electrode collector layer, the plurality of conductor layers being interposed in the plurality of first active material layers;
a second active material layer which comprises a plurality of first portions alternately arranged in parallel to the plurality of first active material layers and a second portion which faces and is parallel to the first electrode collector layer and extends from the plurality of first portions; and
an electrolyte layer which is disposed between the plurality of first active material layers and the plurality of first portions of the second active material layer, between the plurality of first active material layers and the second portion of the second active material layer, and between the plurality of first portions of the second active material layer and the first electrode collector layer,
wherein each of the plurality of conductor layers has a flat plate shape protruding perpendicular to a surface of the first electrode collector layer,
wherein the plurality of first portions and the second portion of the second active material layer are unitary and include the same material, and
wherein the plurality of first portions and the second portion of the second active material layer include lithium (Li) metal.

2. The battery of claim 1, wherein each of the plurality of conductor layers is inserted into a corresponding first active material layer of the plurality of first active material layers such that two side surfaces of each of the plurality of conductor layers directly contact the corresponding first active material layer of the plurality of first active material layers.

3. The battery of claim 1, wherein a first end of each of the plurality of conductor layers contacts the first electrode collector layer and a second end of each of the plurality of conductor layers contacts the electrolyte layer, wherein the second end is opposite to the first end.

4. The battery of claim 1, wherein each of the plurality of conductor layers completely divides each of the plurality of first active material layers into two portions.

5. The battery of claim 1, wherein a first end of each of the plurality of conductor layers contacts the first electrode collector layer and a second end of each of the plurality of conductor layers contacts a corresponding first active material layer of the plurality of first active material layers, wherein the second end is opposite to the first end.

6. The battery of claim 1, wherein the electrolyte layer comprises a solid electrolyte and is wound between the plurality of first active material layers and the plurality of first portions of the second active material layer, between the plurality of first active material layers and the second portion of the second active material layer, and between the plurality of first portions of the second active material layer and the first electrode collector layer.

7. The battery of claim 1, wherein the plurality of first active material layers comprises a positive electrode active material including sintered polycrystalline ceramics which provides a positive electrode.

8. The battery of claim 1, wherein each of the plurality of conductor layers comprises at least one metal material of palladium (Pd), gold (Au), platinum (Pt), and silver (Ag) and an alloy thereof.

* * * * *